(12) United States Patent
Suzuki et al.

(10) Patent No.: US 9,769,369 B2
(45) Date of Patent: Sep. 19, 2017

(54) IMAGING APPARATUS, IMAGING SYSTEM, CONTROL METHOD OF IMAGING APPARATUS, AND STORAGE MEDIUM

(71) Applicant: CANON KABUSHIKI KAISHA, Tokyo (JP)

(72) Inventors: Yutaka Suzuki, Tsukubamirai (JP); Kentaro Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 14/548,150

(22) Filed: Nov. 19, 2014

(65) Prior Publication Data

US 2015/0138368 A1 May 21, 2015

(30) Foreign Application Priority Data

Nov. 21, 2013 (JP) ................................. 2013-240990
Jan. 31, 2014 (JP) ................................. 2014-017756

(51) Int. Cl.
*H04N 5/33* (2006.01)
*H04N 5/232* (2006.01)
*H04N 5/225* (2006.01)
*H04N 5/235* (2006.01)

(52) U.S. Cl.
CPC ....... *H04N 5/23206* (2013.01); *H04N 5/2254* (2013.01); *H04N 5/2351* (2013.01); *H04N 5/23245* (2013.01)

(58) Field of Classification Search
CPC .......................... H04N 5/23206; H04N 5/2254
USPC ........................................................ 348/164
See application file for complete search history.

(56) References Cited

U.S. PATENT DOCUMENTS

2006/0244583 A1* 11/2006 Kawada ................ H04N 5/238
340/468

2012/0327208 A1  12/2012 Higaki et al.
2014/0348498 A1* 11/2014 Aiba ..................... G03B 13/32
396/20

FOREIGN PATENT DOCUMENTS

| CN | 102342099 A | 2/2012 | |
|---|---|---|---|
| CN | 103379272 A | 10/2013 | |
| JP | H07107355 A | 4/1995 | |
| JP | 2007-202034 A | 8/2007 | |
| JP | 2013-168745 A | 8/2013 | |
| WO | WO 2013/121880 A1 * | 8/2013 | ............. G03B 13/32 |

* cited by examiner

*Primary Examiner* — Hung Dang
*Assistant Examiner* — Girumsew Wendmagegn
(74) *Attorney, Agent, or Firm* — Canon USA Inc., IP Division

(57) ABSTRACT

An imaging apparatus that communicate with an external apparatus through a network includes an imaging optical system; an imaging unit that captures an image of an object by the imaging optical system; an optical filter; an inserting and removing unit that inserts and removes the optical filter into and from an optical path of the imaging optical system; a receiving unit that receives an adjustment command from the external apparatus through the network, the command including individual adjustment values respectively for insertion and removal of the optical filter into and form the optical path; an automatically determining unit that, based on one of the adjustment values, automatically determines the other adjustment value in the adjustment command; and a control unit that controls the inserting and removing unit based on the one adjustment value received by the receiving unit and the other adjustment value determined by the automatically determining unit.

16 Claims, 23 Drawing Sheets

FIG. 8

```
<s:Body
xmlns:xsi="http://www.w3.org/2001/XMLSchema-instance"
xmlns:xsd="http://www.w3.org/2001/XMLSchema"
xmlns:img20="http://www.onvif.org/ver20/schema"
        <GetOptionsResponse xmlns="http://www.onvif.org/ver20/imaging/wsdl">
                <ImagingOptions20>
                        . . . . . .
                        <Imag20:IrCutFilterModes>ON</img20:IrCutFilterModes>
                        <Imag20:IrCutFilterModes>OFF</img20:IrCutFilterModes>
                        <Imag20:IrCutFilterModes>AUTO</img20:IrCutFilterModes>
                </ImagingOptions20>
                <ImagingOptions20Extension2>
                        . . . . . .
                <ImagingOptions20Extension2>
                        <IrCutFilterAutoAdjustmentOptions>
                                <img20:Mode>ToOn</img20:Mode>
                                <img20:Mode>ToOff</img20:Mode>
                                <img20:BoundaryOffset>true</img20:BoundaryOffset>
                                <img20:ResponseTime>
                                        <img20:Min>PT0S</img20:Min>
                                        <img20:Max>PT30M<img20:Max>
                                </img20:ResponseTime>
                        </IrCutFilterAutoAdjustmentOptions>
                </ImagingOptions20Extension2>
                . . . . . .
                </ImagingOptions20Extension2>
        </GetOptionsResponse>
</s:Body>
```

FIG. 9A

```
<s:Body
xmlns:xsi="http://www.w3.org/2001/XMLSchema-instance"
xmlns:xsd="http://www.w3.org/2001/XMLSchema"
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>ToOn</BoundaryType>
                                <BoundaryOffset>0.25</BoundaryOffset>
                                <ResponseTime>PT1M30S</ResponseTime>
                        </IrCutFilterAutoAdjustment>
                </ImagingSettings>
                <ForcePersistence>false</ForcePersistence>
        </SetImagingSettings>
</s:Body>
```

FIG. 9B

```
<S:Body
xmlns:xsi="http://www.w3.org/2001/XMLSchema-instance"
xmlns:xsd="http://www.w3.org/2001/XMLSchema"
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>ToOff</BoundaryType>
                                <BoundaryOffset>0.16</BoundaryOffset>
                                <ResponseTime>PT1M10S</ResponseTime>
                        </IrCutFilterAutoAdjustment>
                </ImagingSettings>
                <ForcePersistence>false</ForcePersistence>
        </SetImagingSettings>
</s:Body>
```

FIG. 11

| BoundaryOffset VALUE | −1 | ... | 1 |
|---|---|---|---|
| BRIGHTNESS VALUE OF ToOff | 20 | ... | 40 |
| BRIGHTNESS VALUE OF ToOn | 50 | ... | 100 |

IMAGING APPARATUS, IMAGING SYSTEM, CONTROL METHOD OF IMAGING APPARATUS, AND STORAGE MEDIUM

BACKGROUND OF THE INVENTION

Field of the Invention

The present invention relates to an imaging apparatus and an imaging system. In particular, the present invention relates to an imaging apparatus or the like in which an optical filter can be inserted into and removed from an optical path of an imaging optical system.

Description of the Related Art

There has been known a technology that inserts and removes an optical filter into and from an imaging optical system. An example may be an imaging apparatus configured such that an imaging mode can be switched between visible-light imaging and infrared imaging by inserting and removing an infrared cut filter or the like into and from an optical path of an imaging optical system. In this case, the visible-light imaging represents that the imaging apparatus captures an image of an object while the infrared cut filter is inserted into the optical path of the imaging optical system. Also, the infrared imaging represents that the imaging apparatus captures an image of the object while the infrared cut filter is removed from the optical path of the imaging optical system.

Japanese Patent Laid-Open No. 7-107355 discloses an imaging apparatus that controls insertion and removal of an infrared cut filter with respect to an optical path of an imaging optical system by determining the brightness of the outside.

Also, since a network technology is spreading rapidly, a need of a user of controlling an imaging apparatus from an external apparatus through a network is growing. The need involves insertion and removal control of an optical filter, such as an infrared cut filter, with respect to an optical path of an imaging optical system.

However, Japanese Patent Laid-Open No. 7-107355 has not expected that setting relating to the insertion and removal control of the optical filter with respect to the optical path of the imaging optical system is made from the external apparatus through the network. Further, it may be expected that a user desires to make setting etc. for the brightness level and delay time of an object, the setting which relates to the insertion and removal control of the optical filter with respect to the optical path of the imaging optical system of the imaging apparatus.

Since the setting made from the external apparatus through the network is made with a high degree of freedom, it is conceived that such setting may not be often reflected as the user intends. In this case, the optical filter may be unintentionally inserted into or removed from the optical path of the imaging optical system, and the captured image may be abnormal. Further, an abnormal operation may occur and an image may not be captured.

SUMMARY OF THE INVENTION

The present invention provides an imaging apparatus or the like that can increase a degree of freedom for setting relating to insertion and removal of an optical filter with respect to an optical path of an imaging optical system.

An imaging apparatus according to an aspect of the invention makes communication with an external apparatus through a network. The imaging apparatus includes an imaging optical system; an imaging unit configured to capture an image of an object by the imaging optical system; an optical filter; an inserting and removing unit configured to insert and remove the optical filter into and from an optical path of the imaging optical system; a receiving unit configured to receive an adjustment command from the external apparatus through the network, the adjustment command including individual adjustment values respectively for a case in which the optical filter is inserted into the optical path and a case in which the optical filter is removed from the optical path; an automatically determining unit configured to, based on one of the adjustment value of the case in which the optical filter is inserted into the optical path and the adjustment value of the case in which the optical filter is removed from the optical path, automatically determine the other adjustment value in the adjustment command received by the receiving unit; and a control unit configured to control the inserting and removing unit based on the one adjustment value received by the receiving unit and the other adjustment value determined by the automatically determining unit.

Further features of the present invention will become apparent from the following description of exemplary embodiments with reference to the attached drawings.

BRIEF DESCRIPTION OF THE DRAWINGS

FIG. 8 is an illustration showing an example of a configuration of GetOptionsResponse according to the first embodiment of the invention.

FIGS. 9A and 9B are illustrations each showing an example of a configuration of SetImagingSettings according to the first embodiment of the invention.

FIG. 11 is a table for describing SetImagingSettings reception processing according to the first embodiment of the invention.

DESCRIPTION OF THE EMBODIMENTS

Embodiments of the invention are described in detail below with reference to the drawings. Configurations described in the following embodiments are merely examples, and the invention is not limited to the illustrated configurations.

It is assumed that an adjustment command (hereinafter, occasionally referred to as command) in the following embodiments is determined based on, for example, the standard of Open Network Video Interface Forum (hereinafter, occasionally referred to as ONVIF). With ONVIF standard, the command is defined by using, for example, Extensible Markup Language (XML) Schema Definition language (hereinafter, occasionally referred to as XSD).

First Embodiment

Figure 1:
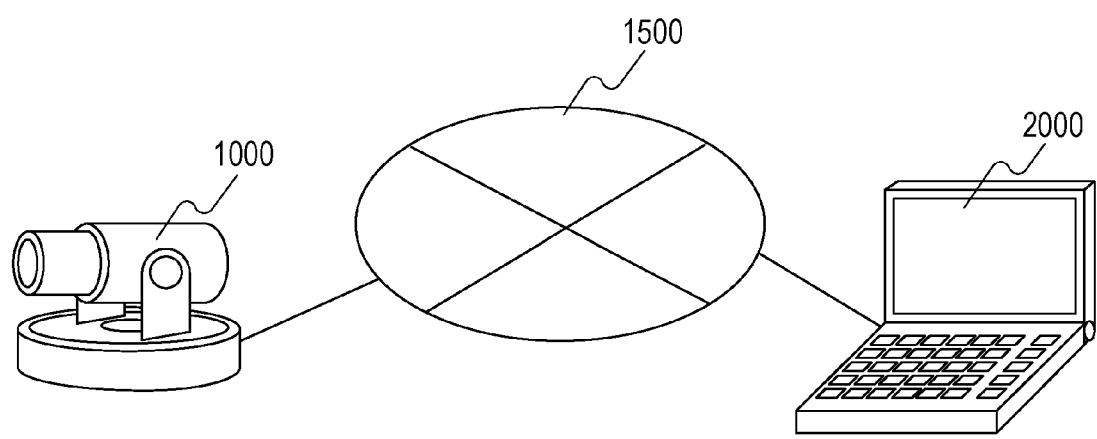
FIG. 1 is an illustration showing an example of a system configuration of a monitoring system according to a first embodiment of the invention.

A network configuration according to this embodiment is described below with reference to FIG. 1. To be more specific, FIG. 1 is an illustration showing an example of a system configuration of a monitoring system according to this embodiment.

In the monitoring system according to this embodiment, an imaging apparatus 1000 and a client apparatus 2000 are connected through an IP network 1500 (through a network) so that communication can be made. Accordingly, the imaging apparatus 1000 can distribute a captured image to the client apparatus 2000 through the IP network 1500.

It is assumed that the imaging apparatus 1000 according to this embodiment is a monitoring camera that takes a movie, and more specifically a network camera used for monitoring.

Also, the client apparatus 2000 according to this embodiment is an example of an external apparatus such as a PC. The monitoring system according to this embodiment corresponds to an imaging system.

Also, it is assumed that the IP network 1500 is formed of a plurality of routers, switches, cables, etc., that satisfy a communication standard, for example, Ethernet (registered trademark). However, in this embodiment, the communication standard, scale, or configuration is not limited as long as communication can be made between the imaging apparatus 1000 and the client apparatus 2000.

For example, the IP network 1500 may be formed of the Internet, a wired local area network (LAN), a wireless LAN, a wide area network (WAN), or the like. The imaging apparatus 1000 may be compliant with Power Over Ethernet (PoE®), and may be supplied with power through a LAN cable.

The client apparatus 2000 transmits commands which are various adjustment commands to the imaging apparatus 1000. These commands include a command for changing the image capturing direction and field angle of the imaging apparatus 1000, a command for changing an imaging parameter, a command for starting streaming of a captured image, and so forth.

In contrast, the imaging apparatus 1000 transmits a response including setting information for such commands and a stream of captured images to the client apparatus 2000. Also, the imaging apparatus 1000 changes the field angle in accordance with the command for changing the field angle received from the client apparatus 2000.

Figure 2:
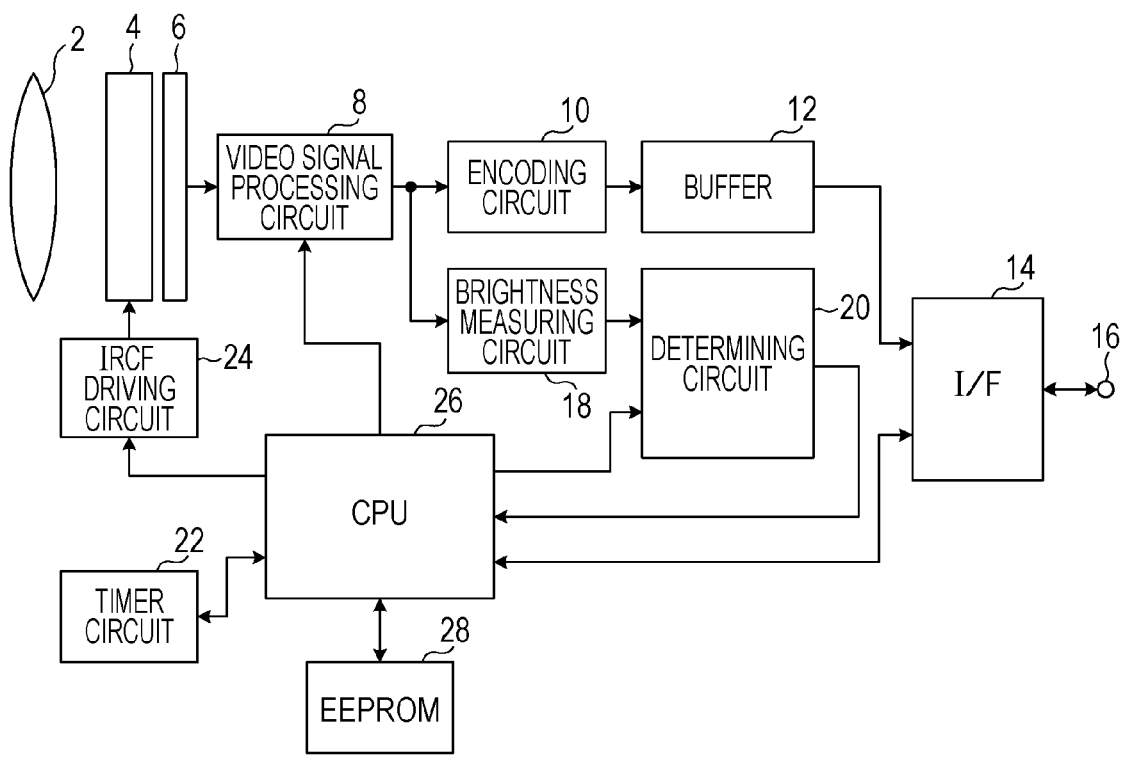
FIG. 2 is an illustration showing an example of a hardware configuration of an imaging apparatus according to the first embodiment of the invention.

Then, FIG. 2 is an illustration showing an example of a hardware configuration of the imaging apparatus 1000 according to this embodiment. An imaging optical system 2 in FIG. 2 focuses an image of an object captured by the imaging apparatus 1000, at an image element 6 through an optical filter 4.

The optical filter 4 in this embodiment is an infrared cut filter (hereinafter, occasionally referred to as IRCF) that cuts infrared rays. The optical filter 4 is inserted into and removed from an optical path between the imaging optical system 2 and the image element 6 by a driving mechanism (not shown, for example, plunger using an electromagnet) based on a driving signal from an optical filter driving circuit 24. It is to be noted that cutting infrared rays in this case represents largely attenuating infrared rays. Hence, infrared rays do not have to be cut by 100%.

The image element 6 is formed of a charge-coupled device (CCD) image sensor, a complementary metal oxide semiconductor (CMOS) image sensor, or the like. The image element 6 captures the image of the object focused by the imaging optical system 2. Further, the image element 6 photoelectrically converts the captured image of the object, and outputs a converted captured image.

The image element 6 according to this embodiment corresponds to an imaging unit that captures an image of an object focused by the imaging optical system 2.

A video signal processing circuit 8 follows an instruction from a central arithmetic processing circuit (or central processing unit, which is hereinafter occasionally referred to as CPU) 26 (described later). To be specific, the video signal processing circuit 8 outputs only a brightness signal of the captured image output from the imaging element 6, or both a brightness signal and a color-difference signal of the captured image output from the imaging element 6, to an encoding circuit 10.

Also, the video signal processing circuit 8 outputs the brightness signal of the captured image output from the image element 6 to a brightness measuring circuit 18 in response to an instruction of the CPU 26.

When only the brightness signal is output from the video signal processing circuit 8, the encoding circuit 10 compresses and encodes the output brightness signal, and outputs the compressed and encoded brightness signal as a captured image to a buffer 12. When the brightness signal and the color-difference signal are output from the video signal processing circuit 8, the encoding circuit 10 compresses and encodes the output brightness signal and color-difference signal, and outputs the compressed and encoded brightness signal and color-difference signal as a captured image to the buffer 12.

The buffer 12 buffers the captured image output from the encoding circuit 10. Then, the buffer 12 outputs the buffered captured image to a communication circuit (hereinafter, occasionally referred to as I/F) 14. The I/F 14 packetizes the captured image output from the buffer 12, and transmits the packetized captured image to the client apparatus 2000 through a communication terminal 16. The communication terminal 16 is formed of a LAN terminal or the like to which a LAN cable is connected.

The I/F 14 corresponds to a receiving unit that receives a command relating to insertion and removal of the optical filter 4 from the external client apparatus 2000.

The brightness measuring circuit 18 measures a brightness value of the current object of the imaging apparatus 1000 based on the brightness signal output from the video signal processing circuit 8. Then, the brightness measuring circuit 18 outputs the measured brightness value to a determining circuit 20. The determining circuit 20 compares the brightness value of the object output from the brightness measuring circuit 18 with a brightness threshold of the object set by the CPU 26, and outputs the comparison result to the CPU 26.

A timer circuit 22 has a delay time set by the CPU 26. Also, the timer circuit 22 measures an elapsed time since reception of the instruction in response to an instruction of starting timing from the CPU 26. Then, if the set delay time has elapsed, the timer circuit 22 outputs a signal indicative of the elapse of the delay time to the CPU 26.

The optical filter driving circuit 24 removes the optical filter 4 from the optical path of the imaging optical system 2 in response to an instruction of the CPU 26. Also, the optical filter driving circuit 24 inserts the optical filter 4 into the optical path of the imaging optical system 2 in response to an instruction of the CPU 26. The optical filter driving circuit 24 according to this embodiment corresponds to an insertion and removal unit that inserts and removes the optical filter 4 into and from the optical path of the imaging optical system 2.

The CPU 26 controls respective components of the imaging apparatus 1000 in a centralized manner. Also, the CPU 26 executes a program stored in an electrically erasable programmable read only memory (hereinafter, occasionally referred to as EEPROM) 28, which is a nonvolatile memory that data is electrically erasable.

The EEPROM 28 can store parameters for operations of the imaging apparatus 1000, commands received from the client apparatus 2000, etc. Alternatively, the CPU 26 may execute control by using hardware. The CPU 26 according to this embodiment corresponds to a control unit that controls the optical filter driving circuit 24 for inserting and removing the optical filter 4.

Also, in this embodiment, the optical filter 4 uses the IRCF; however, it is not limited thereto. For example, the optical filter 4 may use other optical filter, such as an ND filter that reduces an incident light quantity, a beam splitter that changes the destination of transmission light, a filter that transmits only light with a specific wavelength, or a polarizing filter that transmits only a specific polarization component.

Figure 3A:
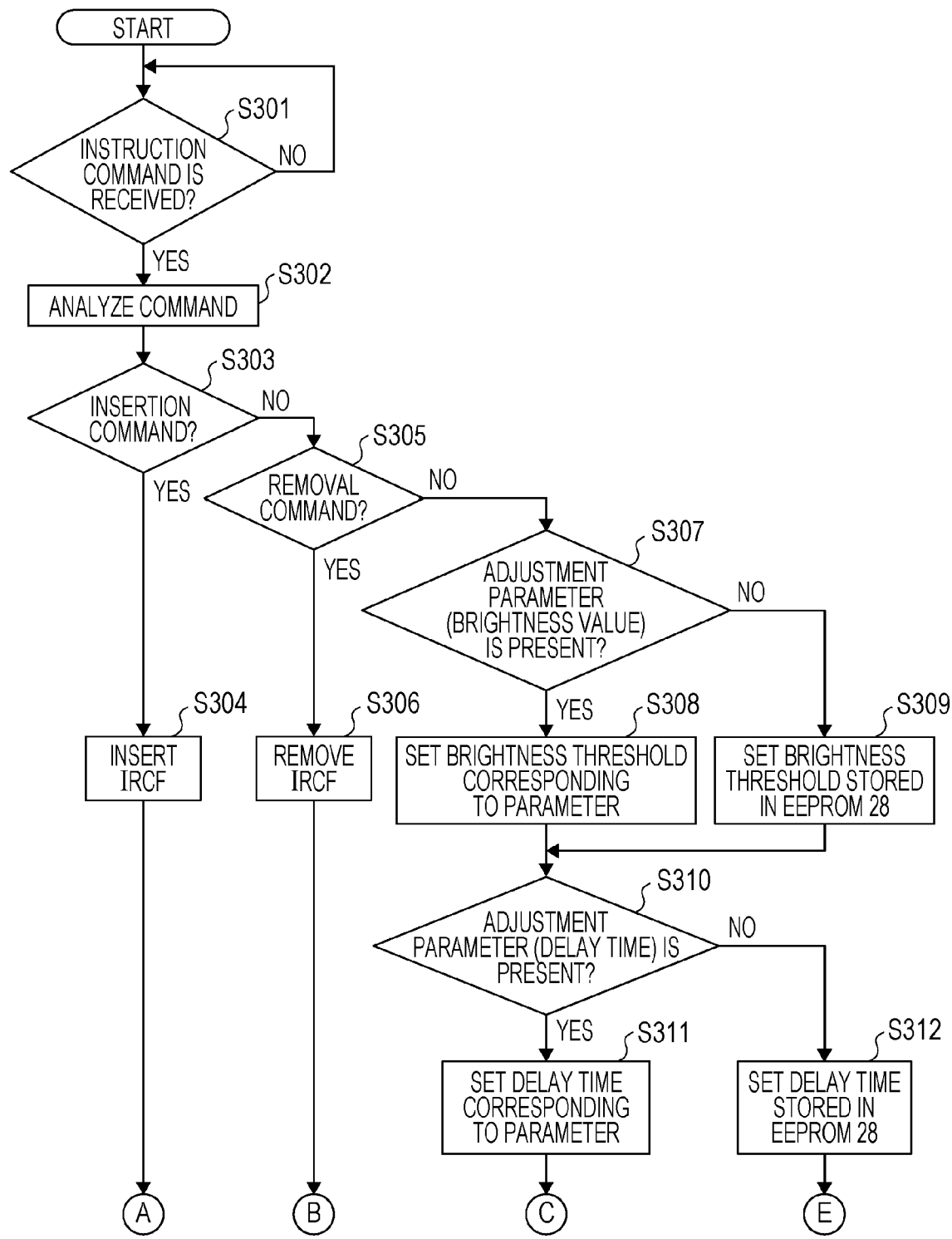
FIGS. 3A and 3B provide a flowchart for describing an operation of the imaging apparatus according to the first embodiment of the invention.
Figure 3B:
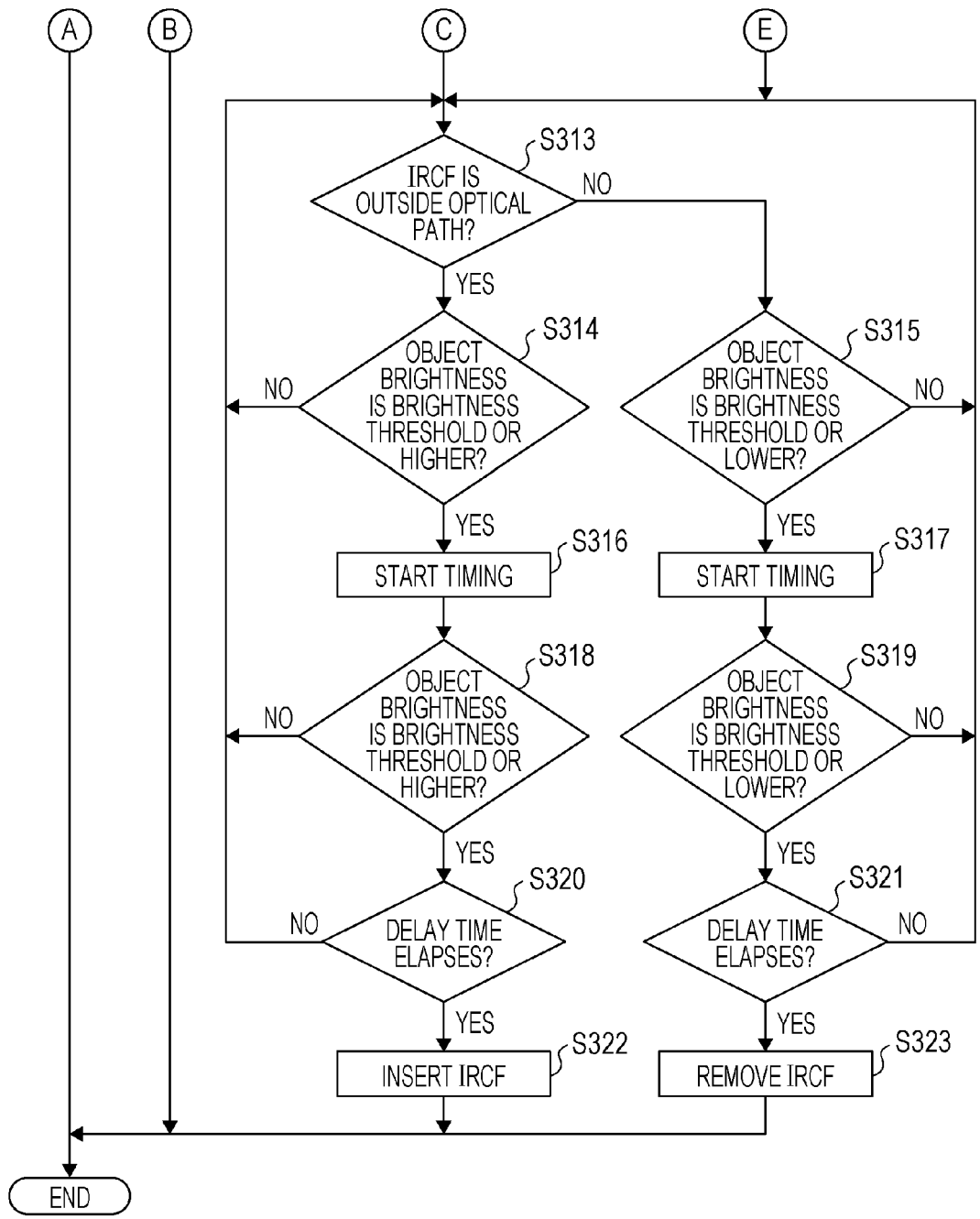

Next, FIGS. 3A and 3B provide a flowchart for describing processing executed by the CPU 26 when the I/F 14 receives an instruction command for instructing insertion or removal of the optical filter 4 into or from the optical path of the imaging optical system 2.

In step S301, the CPU 26 determines whether or not the I/F 14 receives an instruction command treated with proper packet processing. Then, if the instruction command is received, the CPU 26 advances the processing to step S302, and if the instruction command is not received, the CPU 26 returns the processing to step S301.

In step S302, the CPU 26 analyzes the type of the input instruction command (the command received by the I/F 14).

In step S303, the CPU 26 determines whether or not the input command is an insertion command based on the analysis result in step S302. If it is determined that the input command is the insertion command, the CPU 26 advances the processing to step S304. In contrast, if it is determined that the input command is not the insertion command, the CPU 26 advances the processing to step S305.

In step S304, the CPU 26 controls the optical filter driving circuit 24 to insert the optical filter 4 into the optical path of the imaging optical system 2.

In this embodiment, capturing an image of an object by the imaging apparatus 1000 while the optical filter 4 is inserted into the optical path of the imaging optical system 2 is referred to as visible-light imaging (normal imaging). That is, in the visible-light imaging, the imaging apparatus 1000 captures an image of an object while light from the object is incident on the image element 6 through the optical filter 4.

When the imaging apparatus 1000 executes the visible-light imaging, the CPU 26 gives a high priority to color reproduction of the captured image output from the image element 6, and instructs the video signal processing circuit 8 to output the brightness signal and the color-difference signal to the encoding circuit 10. Consequently, the I/F 14 distributes a color captured image. Thus, in this embodiment, an imaging mode of the imaging apparatus 1000 when the imaging apparatus 1000 executes the visible-light imaging is occasionally referred to as color mode.

In step S305, the CPU 26 determines whether or not the input command is a removal command based on the analysis result in step S302 if it is determined that the input command is not the insertion command in step S303. Then, if it is determined that the input command is the insertion command, the CPU 26 advances the processing to step S306. In contrast, if it is determined that the input command is not the removal command, the CPU 26 advances the processing to step S307.

In step S306, the CPU 26 controls the optical filter driving circuit 24 to remove the optical filter 4 from the optical path of the imaging optical system 2.

In this embodiment, capturing an image of an object by the imaging apparatus 1000 while the optical filter 4 is removed from the optical path of the imaging optical system 2 is referred to as infrared imaging. That is, in the infrared imaging, the imaging apparatus 1000 captures an image of this object while light from the object is incident on the image element 6 without the optical filter 4.

When the imaging apparatus 1000 executes the infrared imaging, since the color balance of the captured image output from the image element 6 is collapsed, the CPU 26 instructs the video signal processing circuit 8 to output only the brightness signal to the encoding circuit 10. Consequently, the I/F 14 distributes a monochrome captured image. Thus, in this embodiment, an imaging mode of the imaging apparatus 1000 when the imaging apparatus 1000 executes the infrared imaging is occasionally referred to as monochrome mode.

If it is determined that the input command is not the removal command in step S305, in step S307, the CPU 26 determines whether or not the automatic insertion and removal command includes a parameter indicative of a brightness threshold based on the analysis result in step S302. In this case, the automatic insertion and removal command may have described therein an adjustment value relating to insertion and removal of the optical filter 4.

The adjustment value may be omitted. Also, the adjustment value is, for example, a parameter indicative of a brightness threshold or a parameter indicative of a delay time.

If it is determined that the command includes the parameter, the CPU 26 advances the processing to step S308, and sets the brightness threshold corresponding to the parameter included in the command at the determining circuit 20.

In contrast, if it is determined that the command does not include the parameter, the CPU 26 advances the processing to step S309, reads a brightness threshold from a parameter previously stored in the EEPROM 28, and sets the brightness threshold at the determining circuit 20.

In step S310, the CPU 26 determines whether or not the command includes a parameter indicative of a delay time based on the analysis result in step S302. If it is determined that the command includes the parameter, the CPU 26 advances the processing to step S311, and sets the delay time corresponding to the parameter included in the command at the timer circuit 22.

In contrast, if it is determined that the command does not include the parameter, the CPU 26 advances the processing to step S312, reads a delay time from a parameter previously stored in the EEPROM 28, and sets the delay time at the timer circuit 22.

In step S313, the CPU 26 determines whether or not the optical filter 4 is located outside the optical path. Then, if it is determined that the optical filter 4 is located outside the optical path, the CPU 26 advances the processing to step S314. In contrast, if it is determined that the optical filter 4 is located within the optical path, the CPU 26 advances the processing to step S315.

In step S314, if it is determined that the optical filter 4 is located outside the optical path in step S313, the CPU 26 causes the determining circuit 20 to determine whether or not the current brightness of the object is the brightness threshold set by the CPU 26 or higher. Then, if it is determined that the brightness is the brightness threshold or higher, the CPU 26 advances the processing to step S316. In contrast, if it is determined that the brightness is not the brightness threshold or higher, the CPU 26 returns the processing to step S313.

In step S316, the CPU 26 instructs the timer circuit 22 to start timing, and advances the processing to step S318.

In step S318, before a signal indicative of elapse of the delay time is input from the timer circuit 22, the CPU 26 causes the determining circuit 20 to determine whether or not the current brightness of the object is the brightness threshold set by the CPU 26 or higher. Then, if it is determined that the brightness is the brightness threshold or higher, the CPU 26 advances the processing to step S320. In contrast, if it is determined that the brightness is not the brightness threshold or higher, the CPU 26 returns the processing to step S313.

In step S320, the CPU 26 determines whether or not a signal indicative of elapse of the delay time is input from the timer circuit 22. If it is determined that the signal is input, the CPU 26 advances the processing to step S322. In contrast, if it is determined that the delay time has not elapsed, the CPU 26 returns the processing to step S313.

In step S322, the CPU 26 instructs the optical filter driving circuit 24 to insert the optical filter 4 into the optical path of the imaging optical system 2.

In contrast, in step S315, if it is determined that the optical filter 4 is located within the optical path in step S313, the CPU 26 causes the determining circuit 20 to determine whether or not the current brightness of the object is the brightness threshold set by the CPU 26 or lower. Then, if it is determined that the brightness is the brightness threshold or lower, the CPU 26 advances the processing to step S317. In contrast, if it is determined that the brightness is not the brightness threshold or lower, the CPU 26 returns the processing to step S313.

In step S317, the CPU 26 instructs the timer circuit 22 to start timing, and advances the processing to step S319.

In step S319, before a signal indicative of elapse of the delay time is input from the timer circuit 22, the CPU 26 causes the determining circuit 20 to determine whether or not the current brightness of the object is the brightness threshold set by the CPU 26 or lower. If it is determined that the brightness is the brightness threshold or lower, the CPU 26 advances the processing to step S321. In contrast, if it is determined that the brightness is not the brightness threshold or lower, the CPU 26 returns the processing to step S313.

In step S321, the CPU 26 determines whether or not a signal indicative of elapse of the delay time is input from the timer circuit 22. If it is determined that the signal is input, the CPU 26 advances the processing to step S323. In contrast, if it is determined that the delay time has not elapsed, the CPU 26 returns the processing to step S313.

In step S323, the CPU 26 instructs the optical filter driving circuit 24 to remove the optical filter 4 from the optical path of the imaging optical system 2.

Figure 4:
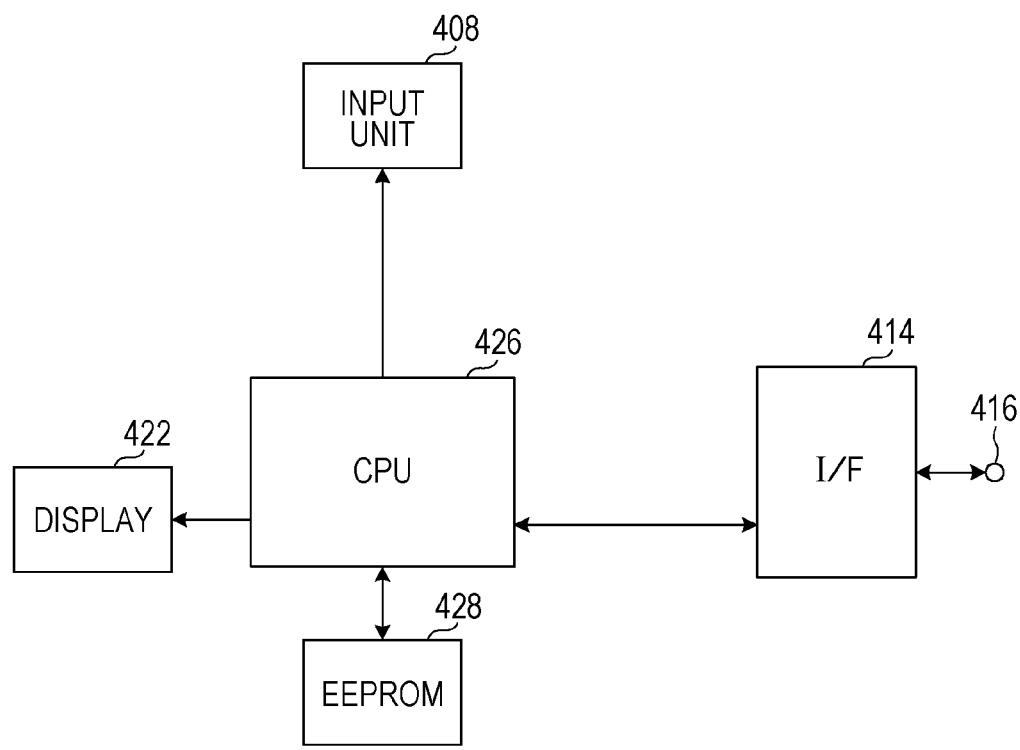
FIG. 4 is an illustration showing an example of a hardware configuration of a client apparatus according to the first embodiment of the invention.

Next, FIG. 4 is an illustration showing an example of a hardware configuration of the client apparatus 2000 according to this embodiment. The client apparatus 2000 according to this embodiment is formed as a computer apparatus which is an external apparatus and is connected with the IP network 1500. The client apparatus 2000 is typically a general-purpose computer such as a personal computer (hereinafter, occasionally referred to as PC).

A CPU 426 in FIG. 4 controls respective components of the client apparatus 2000 in a centralized manner. Also, the CPU 426 executes a program stored in an EEPROM 428 (described later). Alternatively, the CPU 426 may execute control by using hardware. The EEPROM 428 is used as a storage region for the program executed by the CPU 426, a work region during execution of the program, and a storage region for data.

A digital interface (hereinafter, occasionally referred to as I/F) 414 transmits a command etc. to the imaging apparatus 1000 through a communication terminal 416 in response to an instruction from the CPU 426. Also, the I/F 414 receives a response to the command, a captured image distributed by streaming distribution, etc., from the imaging apparatus 1000 through the communication terminal 416. The communication terminal 416 is formed of a LAN terminal or the like to which a LAN cable is connected.

An input unit 408 is formed of, for example, a button, a cross-shaped key, a touch panel, a mouse, etc. The input unit 408 receives input of an instruction from a user. For example, the input unit 408 may receive input of a transmission instruction of each of various commands for the imaging apparatus 1000 as an instruction from a user.

Also, when a command transmission instruction for the imaging apparatus 1000 is input from the user, the input unit 408 notifies the CPU 426 about the input. Then, the CPU 426 generates a command for the imaging apparatus 1000 in accordance with the instruction input to the input unit 408. Then, the CPU 426 instructs the I/F 414 to transmit the generated command to the imaging apparatus 1000.

Further, the input unit 408 may receive input of a response of the user for a query message to the user generated when the CPU 426 executes the program stored in the EEPROM 428.

In this case, the CPU 426 decodes and decompresses the captured image output from the I/F 414. Then, the CPU 426 outputs the decoded and decompressed captured image to a display 422. Accordingly, the display 422 displays an image corresponding to the captured image output from the CPU 426. The display 422 according to this embodiment may use a liquid crystal display device, a plasma display device, or a cathode-ray tube (hereinafter, occasionally referred to as CRT) display device such as a Braun tube display device.

While the internal configurations of the imaging apparatus 1000 and the client apparatus 2000 have been described above, the processing blocks shown in FIGS. 2 and 4 are provided for describing desirable embodiments of the imaging apparatus and the external apparatus according to an aspect of the invention, and hence the processing blocks are not limited thereto. For example, a sound input unit or a sound output unit may be provided. In this way, various modifications and changes may be made within the scope of the invention. Also, the optical filter 4 may not be only the optical filter, and may be a different kind of optical filter, such as a neutral-density (ND) filter, or a combination of different kinds of optical filters.

Figure 5:
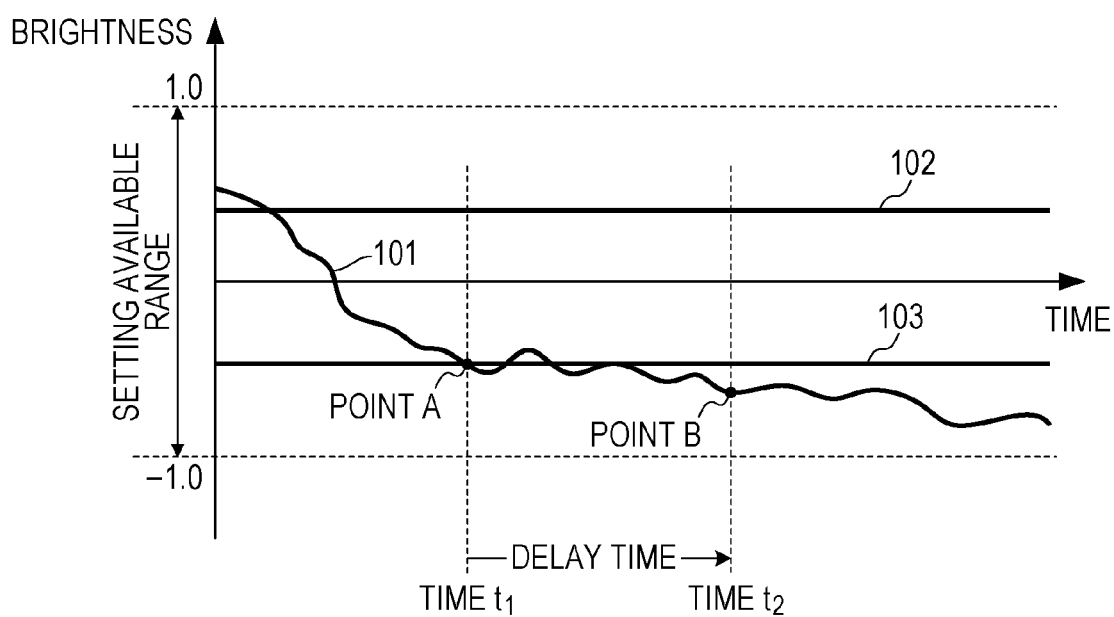
FIG. 5 is a time transition diagram of brightness for showing an operation example of the imaging apparatus according to the first embodiment of the invention.

Next, FIG. 5 is an illustration for describing an operation of the imaging apparatus 1000 according to this embodiment when the brightness threshold and delay time parameters are set. A graph 101 in FIG. 5 indicates a change over time of the brightness of the object of the imaging apparatus 1000. The graph 101 represents that the brightness of the object decreases over time, like a time period of sunset.

A brightness threshold 102 indicates a brightness threshold used for determining whether or not the optical filter 4 is inserted into the optical path of the imaging optical system 2. Also, a brightness threshold 103 indicates a brightness threshold used for determining whether or not the optical filter 4 is removed from the optical path of the imaging optical system 2.

In this embodiment, brightness thresholds described in the automatic insertion and removal commands are normalized to values within a predetermined range. To be specific, the brightness thresholds are limited to values from −1.0 to +1.0. Hence, as shown in FIG. 5, the range that can be designated by the brightness threshold 102 and the brightness threshold 103 is a range from −1.0 to +1.0.

For example, as shown in FIG. 5, if the brightness value of the object decreases and the brightness value becomes lower than the brightness threshold 103, the CPU 26 sets a delay time at the timer circuit 22, and instructs the timer circuit 22 to start timing. Thus, the timer circuit 22 starts timing.

In FIG. 5, the brightness value of the object becomes lower than the brightness threshold 103 at a point A. The time at which the brightness value becomes lower is $t_1$. The CPU 26 sets the delay time at the timer circuit 22 when the brightness value becomes lower. The CPU 26 causes the optical filter 4 to be continuously inserted in the optical path of the imaging optical system 2 and does not cause the optical filter 4 to be removed from the optical path of the imaging optical system 2 until the set delay time elapses.

With such an operation of the CPU 26, even if the graph 101 frequently intersects with the brightness threshold 103, the imaging mode of the imaging apparatus 1000 can be prevented from being frequently switched between the visible-light imaging and the infrared imaging. Also, with such an operation, the probability of that the brightness value of the object is stably lower than the brightness threshold 103 can be increased. Such an operation is effective even if the object brightness varies in a short period of time because of flicker or the like of an illumination such as a fluorescent lamp.

When the delay time set at the timer circuit 22 elapses and the time becomes $t_2$, the CPU 26 instructs the optical filter driving circuit 24 to remove the optical filter 4 from the optical path of the imaging optical system 2. Accordingly, the imaging apparatus 1000 executes the infrared imaging. The brightness value of the object at this time (time $t_2$) is a point B.

As described above, in this embodiment, the user can cause the imaging apparatus 1000 to transmit the automatic insertion and removal command having described therein the adjustment value relating to insertion and removal of the optical filter 4 by operating the client apparatus 2000. In this case, the adjustment value includes a parameter indicative of the brightness of the object and a parameter indicative of the delay time.

Accordingly, even if the brightness value of the object is close to the brightness threshold, the imaging apparatus 1000 which has received the automatic insertion and removal command can prevent the optical filter 4 from being frequently inserted into and removed from the optical path of the imaging optical system 2. Also, even when the brightness of the object frequently varies because of, for example, flicker of an illumination, the imaging apparatus 1000 can prevent the optical filter 4 from being frequently inserted into and removed from the optical path of the imaging optical system 2.

Figure 6:
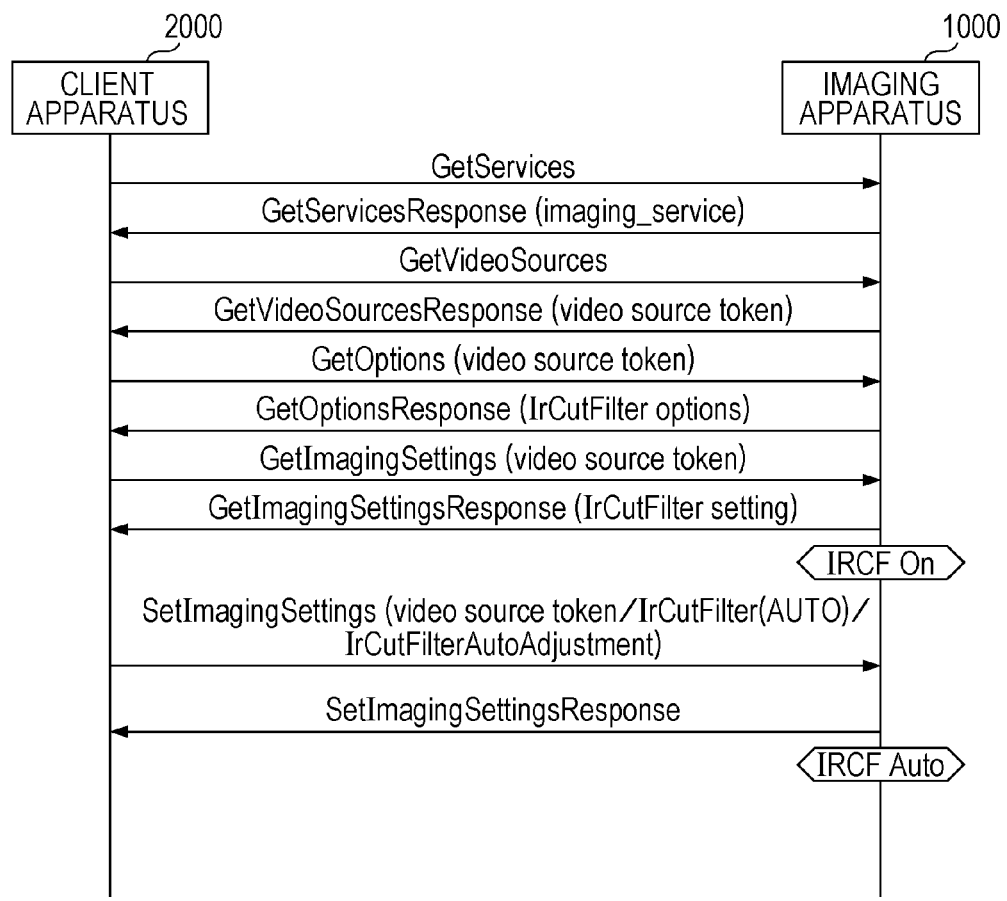
FIG. 6 is an illustration for describing a command sequence of the imaging apparatus and the client apparatus according to the first embodiment of the invention.

Next, FIG. 6 is a sequence diagram for describing a typical command sequence between the imaging apparatus 1000 and the client apparatus 2000 according to this embodiment, for setting the adjustment value relating to insertion and removal of the optical filter 4. In FIG. 6, transactions of commands are described by using a message sequence chart defined by ITU-T Recommendation 2.120 standard.

A transaction according to this embodiment represents a pair of a command transmitted from the client apparatus 2000 to the imaging apparatus 1000 and a response from the imaging apparatus 1000 to the client apparatus 2000 for the command. In FIG. 6, it is assumed that the imaging apparatus 1000 is connected with the client apparatus 2000 through the IP network 1500.

First, by a GetServices transaction, the client apparatus 2000 can acquire types of Web services supported (provided) by the imaging apparatus 1000 and an address URI for using each Web service.

To be specific, the client apparatus 2000 transmits a GetServices command to the imaging apparatus 1000. The imaging apparatus 1000 which has received the command returns a response to the command. With this response, the client apparatus 2000 can acquire information indicative of whether or not the imaging apparatus 1000 can execute the automatic insertion and removal command etc., that is, whether or not the imaging apparatus 1000 supports imaging_service. In this embodiment, this response indicates that the imaging apparatus 1000 supports imaging_service.

Then, with a GetVideoSources transaction, the client apparatus 2000 acquires a list of VideoSources held in the imaging apparatus 1000. In this case, VideoSource is a set of parameters indicative of performances of a single image element 6 included in the imaging apparatus 1000.

To be specific, VideoSource includes video source token which is ID of VideoSource, Resolution indicative of the resolution of a captured image which can be output, etc. That is, VideoSource is a set of parameters indicative of performances of a single image element 6 included in the imaging apparatus 1000. The client apparatus 2000 transmits a GetVideoSources command to the imaging apparatus 1000.

The imaging apparatus 1000 which has received the command returns a response to the command. With the return command, the client apparatus 2000 can acquire video source token indicative of VideoSource available for setting relating to insertion and removal of the optical filter 4. In this embodiment, the response includes video source token indicative of VideoSource corresponding to the image element 6.

Then, by a GetOptions transaction, the client apparatus 2000 acquires information indicative of a command which can be executed by the imaging apparatus 1000 among an insertion command, a removal command, and an automatic insertion and removal command, from the imaging apparatus 1000. Also, with this transaction, the client apparatus 2000 can acquire information indicative of an adjustment value which can be described in the automatic insertion and removal command.

The client apparatus 2000 transmits a GetOptions command to the imaging apparatus 1000 (to be specific, an address URI for using imaging_service of the imaging apparatus 1000). This command includes video source token included in GetVideoSourcesResponse received from the imaging apparatus 1000.

The imaging apparatus 1000 which has received the command returns a response to the command, to the client apparatus 2000. In this embodiment, the response includes IRCutFilterOptions. The IRCutFilterOptions describes information indicative of a command which can be executed by the imaging apparatus 1000 among the insertion command, the removal command, and the automatic insertion and removal command.

Further, the IRCutFilterOptions describes information indicative of the adjustment value which can be executed (set) by the imaging apparatus 1000 among adjustment values which can be described in the automatic insertion and removal command.

Then, by a GetImagingSettings transaction, the client apparatus 2000 acquires information indicative of the state of insertion and removal of the optical filter 4 with respect to the optical path of the imaging optical system 2, from the imaging apparatus 1000.

The client apparatus 2000 transmits a GetImagingSettings command to the imaging apparatus 1000. This command includes video source token included in GetVideoSourcesResponse received from the imaging apparatus 1000. The imaging apparatus 1000 which has received the command returns a response to the command. In this embodiment, the response includes IRCutFilter setting. The IRCutFilter setting describes information indicative of whether the optical filter 4 is currently inserted into the optical path of the imaging optical system 2 or the optical filter 4 is currently removed from the optical path. In this embodiment, the IRCutFilter setting describes information indicative of that the optical filter 4 is currently inserted into the optical path of the imaging optical system 2.

Then, by a SetImagingSettings transaction, the client apparatus 2000 causes the imaging apparatus 1000 to automatically control insertion and removal of the optical filter 4 with respect to the optical path of the imaging optical system 2. The client apparatus 2000 transmits a SetImagingSettings command to an address URI for using imaging_service of the imaging apparatus 1000. This command includes video source token included in GetVideoSourcesResponse received from the imaging apparatus 1000. Further, this command describes information (IrCutFilter field with value "AUTO") indicative of that the imaging apparatus 1000 automatically controls insertion and removal of the optical filter 4 with respect to the optical path of the imaging optical system 2. In addition, this command describes an adjustment value (IrCutFilterAutoAdjustment field). The IrCutFilter field and IrCutFilterAutoAdjustment field are described later.

In contrast, the imaging apparatus 1000 which has received the command returns SetImagingSettingsResponse, to the client apparatus 2000. An argument of this response is omitted. In this case, the response with the argument omitted indicates that the command is successively executed by the imaging apparatus 1000.

Accordingly, the imaging apparatus 1000 executes an operation of automatically determining whether the optical filter 4 is inserted into the optical path of the imaging optical system 2 or the optical filter 4 is removed from the optical path of the imaging optical system 2.

Figure 7:
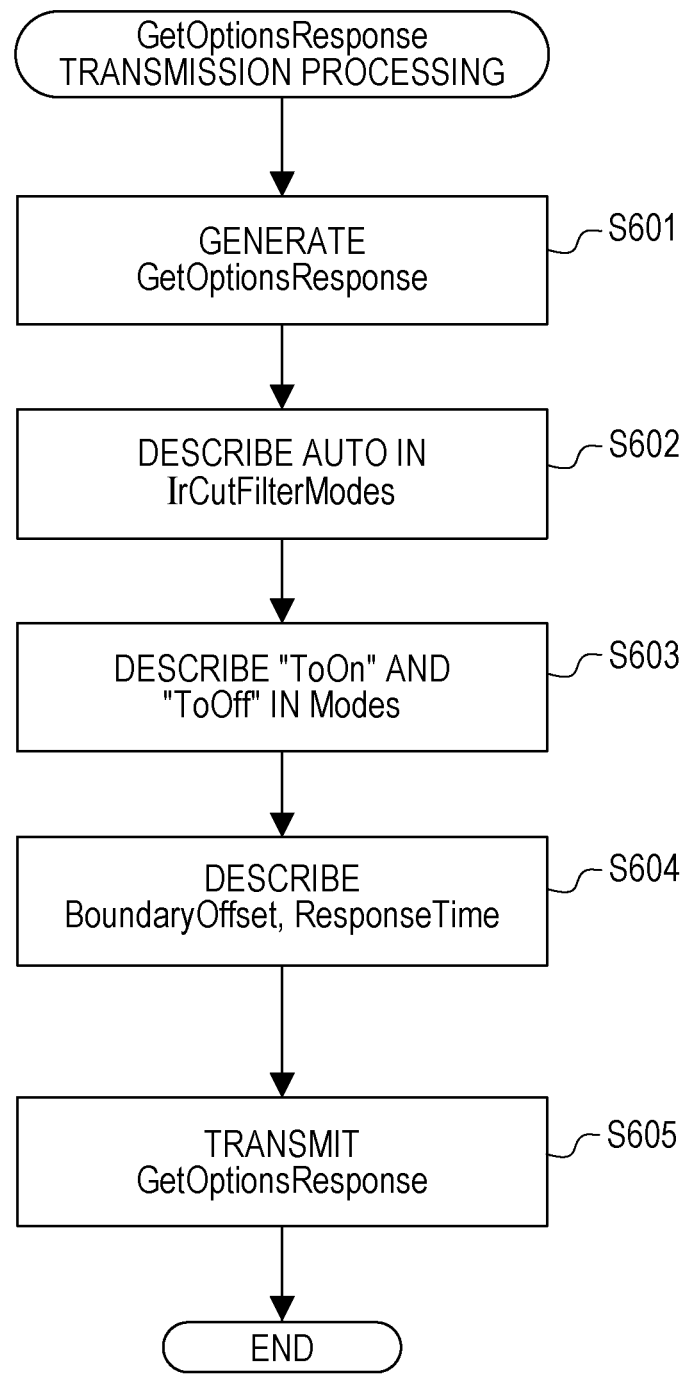
FIG. 7 is a flowchart for describing GetOptionsResponse transmission processing according to the first embodiment of the invention.

Next, FIG. 7 is a flowchart for describing GetOptionsResponse transmission processing in the imaging apparatus 1000 according to this embodiment. This processing is executed by the CPU 26. The CPU 26 starts execution of this processing when the CPU 26 receives the GetOptions command from the client apparatus 2000 through the I/F 14.

The flowchart shown in FIG. 7 is described below with reference to FIG. 8. FIG. 8 is an illustration showing an example of GetOptionsResponse transmitted by the GetOptionsResponse transmission processing.

In step S601, the CPU 26 generates GetOptionsResponse, and causes the EEPROM 28 to store generated GetOptionsResponse.

In step S602, the CPU 26 sets ON, OFF, and AUTO in a value of an IrCutFilterModes field of GetOptionsResponse stored in the EEPROM 28 in step S601.

Accordingly, as shown in FIG. 8, a <ImagingOptions20> tag in GetOptionsResponse is associated with three <img20:IrCutFilterModes> tags. Further, the three <Img20:IrCutFilterModes> tags are respectively associated with ON, OFF, and AUTO.

The IrCutFilterModes field with the value being ON indicates that the imaging apparatus 1000 can receive the insertion instruction command. Also, the IrCutFilterModes field with the value being OFF indicates that the imaging apparatus 1000 can receive the removal instruction command. Further, the IrCutFilterModes field with the value being AUTO indicates that the imaging apparatus 1000 can receive the automatic insertion and removal command.

In step S603, the CPU 26 sets ToOn and ToOff in a value of a Mode field of GetOptionsResponse stored in the EEPROM 28 in step S601.

Accordingly, as shown in FIG. 8, a <IrCutFilterAutoAdjustmentOptions> tag in GetOptionsResponse is associated with two <Img20:Mode> tags. Further, the two <Img20: Mode> tags are respectively associated with ToOn and ToOff.

The Mode field with the value being ToOn indicates that the imaging apparatus 1000 can use the adjustment value for determining whether or not the optical filter 4 is inserted into the optical path of the imaging optical system 2. Also, the Mode field with the value being ToOff indicates that the imaging apparatus 1000 can use the adjustment value for determining whether or not the optical filter 4 is removed from the optical path of the imaging optical system 2.

For example, GetOptionsResponse describing the Mode field with the value being ToOn and the Mode field with the value being ToOff provides indication as follows.

That is, adjustment values which are used by the imaging apparatus 1000 can be set individually for a case in which the optical filter 4 is inserted into the optical path of the imaging optical system 2 and a case in which the optical filter 4 is removed from the optical path of the imaging optical system 2.

In step S604, the CPU 26 sets true in a value of a BoundaryOffset field of GetOptionsResponse stored in the EEPROM 28 in step S601. Further, the CPU 26 sets PT0S in a value of Min field and sets PT30M in a value of Max field of GetOptionsResponse stored in the EEPROM 28 in step S601.

Accordingly, as shown in FIG. 8, the <IrCutFilterAutoAdjustmentOptions> tag in GetOptionsResponse is associated with a <img20:BoundaryOffset> tag. Further, the <IrCutFilterAutoAdjustmentOptions> tag is associated with a <img20:ResponseTime> tag.

Then, the <img20:BoundaryOffset> tag is associated with true. Also, the <img20:ResponseTime> tag is associated with a <img20:Min> tag and a <img20:Max> tag. In this case, the <img20:Min> tag is associated with PT0S. Also, the <img20:Max> tag is associated with PT30M (30 minutes).

The BoundaryOffset field with the value being true indicates that BoundaryOffset can be set in the imaging apparatus 1000. Also, the <img20:Min> tag indicates that the minimum value of time (shortest time) which can be set in the ResponseTime field. Also, the <img20:Max> tag indicates that the maximum value of time (longest time) which can be set in the ResponseTime field.

That is, <img20:Min> and <img20:Max> indicate that the range of time which can be set in the ResponseTime field.

In step S605, the CPU 26 instructs the I/F 14 to transmit GetOptionsResponse stored in the EEPROM 28 in step S601 to the client apparatus 2000.

Then, FIGS. 9A and 9B are illustrations each showing an example of a configuration of the SetImagingSettings command. In SetImagingSettings shown in FIG. 9A, AUTO is set in a value of the IrCutFilter field. To be more specific, in this SetImagingSettings command, the <IrCutFilter> tag is associated with AUTO.

Accordingly, the SetImagingSettings command shown in FIG. 9A corresponds to the automatic insertion and removal command for causing the imaging apparatus 1000 to automatically control insertion and removal of the optical filter 4 with respect to the optical path of the imaging optical system 2.

Also, in the SetImagingSettings command shown in FIG. 9A, ToOn is set in a value of the BoundaryType field. To be more specific, in this SetImagingSettings command, the <IrCutFilterAutoAdjustment> tag is associated with the <BoundaryType> tag. Further, this <BoundaryType> tag is associated with the value of ToOn.

Also, in the SetImagingSettings command shown in FIG. 9A, 0.25 is set in a value of the BoundaryOffset field. To be more specific, in this SetImagingSettings command, the <IrCutFilterAutoAdjustment> tag is associated with the <BoundaryOffset> tag. Further, 0.25 is associated with this <BoundaryOffset> tag.

Further, in the SetImagingSettings command shown in FIG. 9A, PT1M30S is set in a value of SetImagingSettings. To be more specific, in this SetImagingSettings command, the <IrCutFilterAutoAdjustment> tag is associated with the <ResponsTime> tag. This <ResponsTime> tag is associated with PT1M30S. The time set in the value of the ResponseTime field corresponds to a value relating to the delay time when the optical filter 4 is inserted or removed.

Accordingly, the SetImagingSettings command shown in FIG. 9A may be said as a command for providing an instruction to the imaging apparatus 1000 as follows. That is, the command is for causing the imaging apparatus 1000 to use the value of the BoundaryOffset field and the value of the ResponseTime field when the optical filter 4 is inserted into the optical path of the imaging optical system 2.

Next, in SetImagingSettings shown in FIG. 9B, AUTO is set in a value of the IrCutFilter field. To be more specific, in this SetImagingSettings command, the <IrCutFilter> tag is associated with AUTO.

Also, in the SetImagingSettings command shown in FIG. 9B, the value of the BoundaryType field in IrCutFilterAutoAdjustment field is set at ToOff.

To be more specific, in this SetImagingSettings command, the <IrCutFilterAutoAdjustment> tag is associated with the <BoundaryType> tag. Then, this <BoundaryType> tag is associated with ToOff.

Also, in the SetImagingSettings command shown in FIG. 9B, the value of the BoundaryOffset field in the IrCutFilterAutoAdjustment field is set at 0.16.

To be more specific, in this SetImagingSettings command, the first <IrCutFilterAutoAdjustment> tag is associated with the <BoundaryOffset> tag. Then, this <BoundaryOffset> tag is associated with 0.16.

Further, in the SetImagingSettings command shown in FIG. 9B, the value of ResponseTime in the IrCutFilterAutoAdjustment field is set at PT1M10S.

Accordingly, the SetImagingSettings command shown in FIG. 9B may be said as a command for providing an instruction to the imaging apparatus 1000 as follows. That is, the command is for causing the imaging apparatus 1000 to use the value of the BoundaryOffset field and the value of the ResponseTime field when the optical filter 4 is removed from the optical path of the imaging optical system 2.

Then, in the SetImagingSettings command shown in FIG. 9B, the value of the BoundaryOffset field corresponding to the BoundaryType field with the value being ToOff is 0.16.

Figure 10:
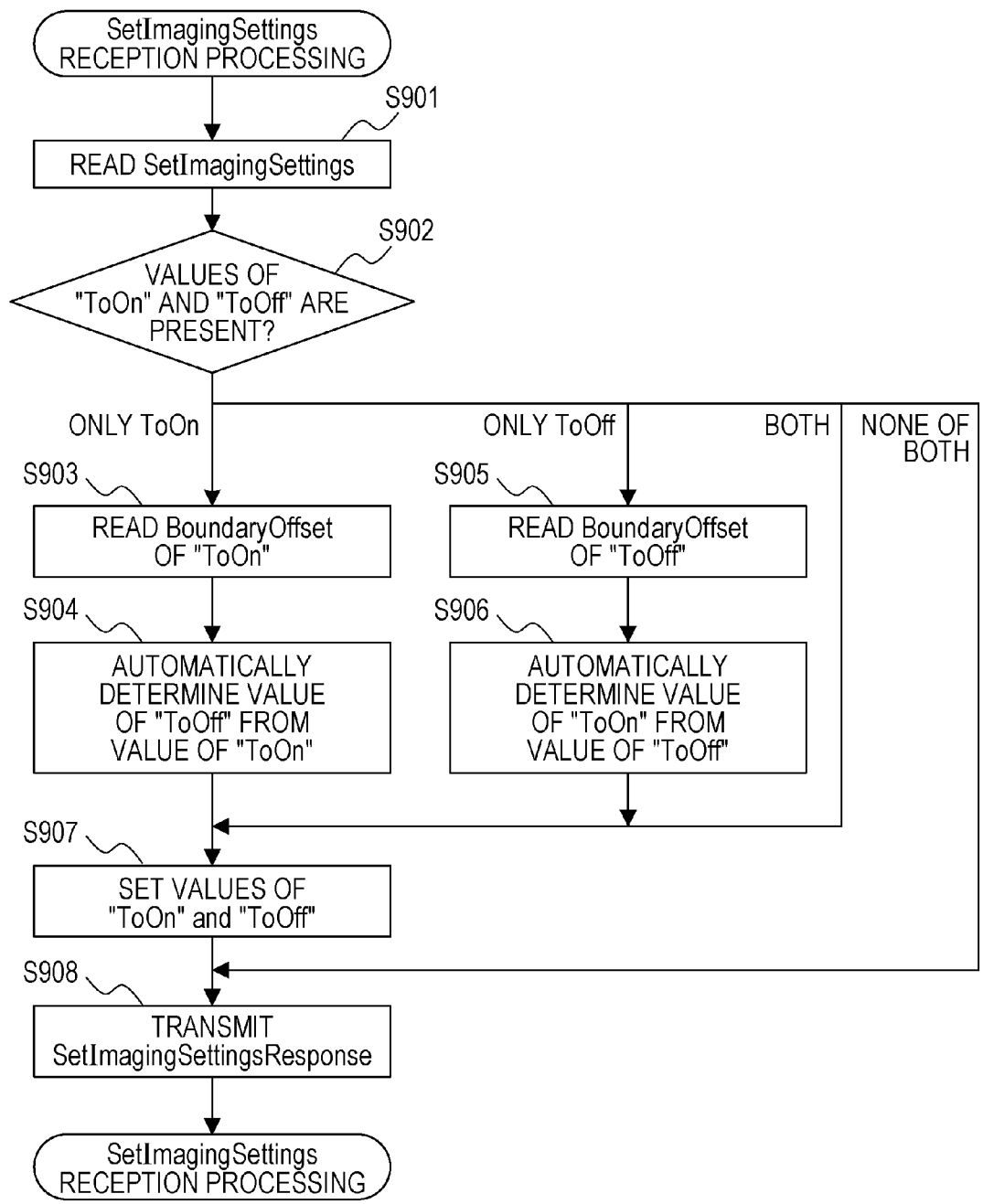
FIG. 10 is a flowchart for describing SetImagingSettings reception processing according to the first embodiment of the invention.

Next, FIG. 10 is a flowchart for describing SetImagingSettings reception processing in the imaging apparatus 1000 according to this embodiment.

This processing is executed by the CPU 26. The CPU 26 starts execution of this processing when the CPU 26 receives the SetImagingSettings command from the client apparatus 2000 through the I/F 14. Also, it is assumed that the SetImagingSettings command received by the I/F 14 is stored in the EEPROM 28.

In step S901, the CPU 26 reads the SetImagingSettings command from the EEPROM 28.

In step S902, the CPU 26 determines whether or not the BoundaryType field with the value being ToOn or ToOff is described in the command read in step S901.

Then, if it is determined that only the BoundaryType field with the value being ToOn is described, the CPU 26 advances the processing to step S903. If it is determined that only the BoundaryType field with the value being ToOff is described, the CPU 26 advances the processing to step S905.

In contrast, if it is determined that the BoundaryType field with the value being ToOn and the BoundaryType field with the value being ToOff are described, the CPU 26 advances the processing to step S907. If it is determined that the BoundaryType field with the value being ToOn or the BoundaryType field with the value being ToOff is not described, the processing is ended.

The CPU 26 according to this embodiment corresponds to a determining unit that determines whether a common brightness threshold is described or individual brightness thresholds are described in the case in which the optical filter 4 is inserted into the optical path of the imaging optical system 2 and the case in which the optical filter 4 is removed from the optical path.

In step S903, the CPU 26 reads the value of the BoundaryOffset field corresponding to the BoundaryType field with the value being ToOn in the command read in step S901. In the case of the command shown in FIG. 9A, the CPU 26 reads 0.25 as the value of the BoundaryOffset field corresponding to the BoundaryType field with the value being ToOn.

In step S904, the CPU 26 reads the value of ToOff corresponding to the value of ToOn read in step S903, from a table previously stored in the EEPROM 28. FIG. 11 shows an example of this table. In this table, the BoundaryOffset value is associated with the brightness threshold of ToOff and the brightness threshold of ToOn.

Alternatively, without reading the value from the previously stored table, a value obtained by offsetting the value of the BoundaryOffset field corresponding to the BoundaryType field of ToOn may be determined as the brightness threshold of ToOff. At this time, the offset amount of the brightness threshold of ToOff may be a constant value (fixed value), or may use a value, in which a difference between the object brightness when the optical filter 4 of the imaging apparatus 1000 is inserted and the object brightness when the optical filter 4 is removed, obtained from the brightness measuring circuit 18, is applied to the brightness threshold. Offsetting represents addition or subtraction of a value.

Also, the value of ToOff may be a default value previously stored in the EEPROM 28, or the value of ToOff may use the same value as the value of ToOn. Alternatively, the value of the BoundaryType field of ToOff in a command received before reception of this SetImagingSettings may be used.

As described above, the CPU 26 according to this embodiment corresponds to an automatic determining unit having a function of, if only one value of the case in which the optical filter 4 is inserted and the case in which the optical filter 4 is removed is described in the command, automatically determining the other value.

In step S905, the CPU 26 reads the value of the BoundaryOffset field corresponding to the BoundaryType field with the value being ToOff in the command read in step S901. In the case of the command shown in FIG. 9B, the CPU 26 reads 0.16 as the value of BoundaryOffset corresponding to the BoundaryType field with the value being ToOff.

In step S906, the CPU 26 reads the value of ToOn corresponding to the value of ToOff read in step S903, from a table previously stored in the EEPROM 28. (For an example of the table, see FIG. 11.)

Alternatively, without reading the value from the previously stored table, a value obtained by offsetting the value of the BoundaryOffset field corresponding to the BoundaryType field of ToOff may be determined as the brightness threshold of ToOn. At this time, the offset amount of the brightness threshold of ToOn may be a constant value (fixed value), or may use a value, in which a difference between the object brightness when the optical filter 4 of the imaging apparatus 1000 is inserted and the object brightness when the optical filter 4 is removed, obtained from the brightness measuring circuit 18, is applied to the brightness threshold.

Also, the value of ToOn may be a default value previously stored in the EEPROM 28, or the value of ToOn may use the same value as the value of ToOff. Alternatively, the value of the BoundaryType field of ToOff in a command received before reception of this SetImagingSettings may be used.

In step S907, the CPU 26 causes the EEPROM 28 to store the brightness threshold.

To be more specific, the CPU 26 causes the EEPROM 28 to store the brightness threshold corresponding to the value read in step S903, as the brightness threshold used for determining whether or not the optical filter 4 is inserted into the optical path of the imaging optical system 2.

Further, the CPU 26 causes the EEPROM 28 to store the brightness threshold corresponding to the value read in step S905, as the brightness threshold used for determining whether or not the optical filter 4 is removed from the optical path of the imaging optical system 2. After the storage, the CPU 26 advances the processing to step S908.

In this embodiment, the SetImagingSettings command received by the I/F 14 is of course information required for the determination in step S902 by the CPU 26.

In step S908, the CPU 26 instructs the I/F 14 to cause the client apparatus 2000 to transmit SetImagingSettingsResponse.

Figure 12:
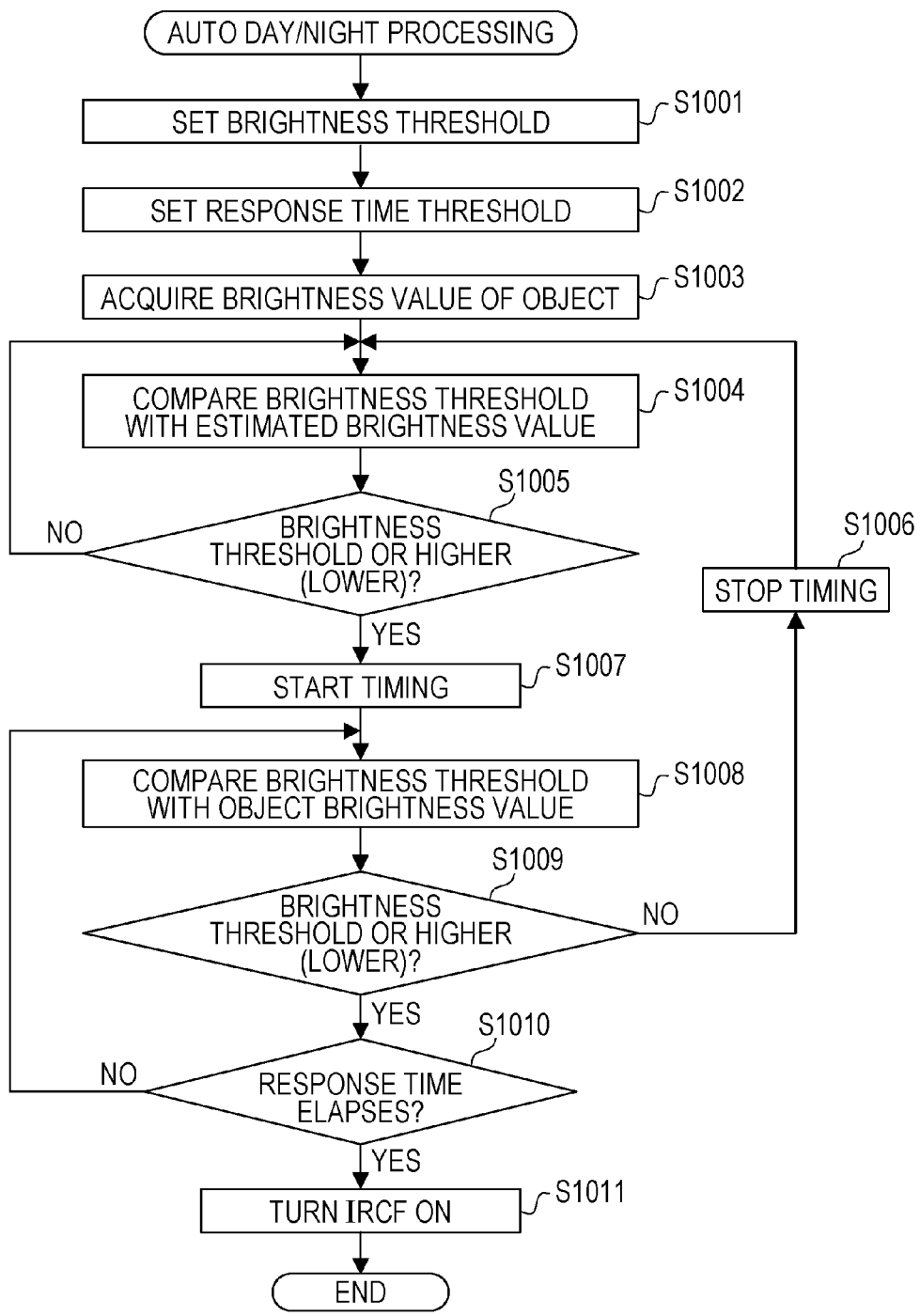
FIG. 12 is a flowchart for describing insertion and removal control of an infrared cut filter by the imaging apparatus according to the first embodiment of the invention.

Next, FIG. 12 is a flowchart for describing auto day/night processing which is processing of causing the imaging apparatus 1000 to automatically control whether or not the optical filter 4 is inserted into the optical path of the imaging optical system 2. This processing is executed by the CPU 26.

In step S1001, the CPU 26 reads a brightness threshold used for the determination whether or not the optical filter 4 is inserted into the optical path of the imaging optical system 2, from the EEPROM 28. Then, the CPU 26 sets the read brightness threshold as a brightness threshold used for the determination whether or not the optical filter 4 is inserted into the optical path of the imaging optical system 2, at the determining circuit 20.

In step S1002, the CPU 26 reads a delay time used for the determination whether or not the optical filter 4 is inserted into the optical path of the imaging optical system 2, from the EEPROM 28. Then, the CPU 26 sets the read delay time as a delay time used for the determination whether or not the optical filter 4 is inserted into the optical path of the imaging optical system 2, at the timer circuit 22. The delay time is indicated as "response time threshold" in FIG. 12.

In step S1003, the CPU 26 instructs the determining circuit 20 to acquire a current brightness value of an object of the imaging apparatus 1000 form the brightness measuring circuit 18.

In step S1004, the CPU 26 instructs the determining circuit 20 to compare the brightness threshold set in step S1001 with the brightness value acquired in step S1003. In step S1004 in FIG. 12, the brightness value acquired in step S1003 is indicated as "estimated brightness value."

In step S1005, the CPU 26 determines whether or not the brightness value acquired in step S1003 is the brightness threshold set in step S1001 or higher as the result of the comparison in step S1004.

Then, if it is determined that the brightness value acquired in step S1003 is the brightness threshold set in step S1001 or higher, the CPU 26 advances the processing to step S1007. In contrast, if it is determined that the brightness value acquired in step S1003 is not the brightness threshold set in step S1001 or higher, the CPU 26 returns the processing to step S1004.

In step S1006, the CPU 26 instructs the timer circuit 22 to stop timing.

In step S1007, the CPU 26 instructs the timer circuit 22 to start timing.

Steps S1008 and S1009 are similar to steps S1004 and S1005, and hence the description thereof is omitted.

In step S1010, the CPU 26 determines whether or not the CPU 26 receives a notification about that the delay time set in step S1002 has elapsed since the timing is started in step S1007, from the timer circuit 22. In step S1010 in FIG. 12, the delay time is indicated as "response time elapses."

If it is determined that the CPU 26 receives the notification about that the delay time set in step S1002 has elapsed since the timing is started in step S1007, from the timer circuit 22, the CPU 26 advances the processing to step S1011.

In contrast, if it is determined that the CPU 26 does not receive the notification about that the delay time set in step S1002 has elapsed since the timing is started in step S1007, from the timer circuit 22, the CPU 26 advances the processing to step S1008.

In step S1011, the CPU 26 instructs the optical filter driving circuit 24 to insert the optical filter 4 into the optical path of the imaging optical system 2. Accordingly, the imaging apparatus 1000 executes the visible-light imaging.

As described above, this embodiment expects the following situation. That is, the situation is a case in which only the value of the BoundaryOffset field corresponding to the BoundaryType field of ToOn or ToOff is described in the command.

In such a case, the imaging apparatus 1000 according to this embodiment can properly determine the value of this BoundaryOffset field, and the value of the BoundaryOffset field of the BoundaryType field of ToOn.

Also, in this embodiment, the processing of causing the imaging apparatus 1000 to automatically control whether or not the optical filter 4 is inserted into the optical path of the imaging optical system 2 has been described with reference to FIG. 12. Now, processing of causing the imaging apparatus 1000 to automatically control whether or not the optical filter 4 is removed from the optical path is also described below.

In step S1001, the CPU 26 reads the brightness threshold used for the determination whether or not the optical filter 4 is removed from the optical path of the imaging optical system 2, from the EEPROM 28. Then, the CPU 26 sets the read brightness threshold as a brightness threshold used for the determination whether or not the optical filter 4 is removed from the optical path of the imaging optical system 2, at the determining circuit 20.

In step S1002, the CPU 26 reads the delay time used for the determination whether or not the optical filter 4 is removed from the optical path of the imaging optical system 2, from the EEPROM 28. Then, the CPU 26 sets the read delay time as a delay time used for the determination whether or not the optical filter 4 is removed from the optical path of the imaging optical system 2, at the timer circuit 22.

Steps S1003 and S1004 are similar to the above-described steps S1003 and S1004, and hence the description thereof is omitted.

In step S1005, the CPU 26 determines whether or not the brightness value acquired in step S1003 is the brightness threshold set in step S1001 or lower as the result of the comparison in step S1004.

Then, if it is determined that the brightness value acquired in step S1003 is the brightness threshold set in step S1001 or lower, the CPU 26 advances the processing to step S1007. In contrast, if it is determined that the brightness value acquired in step S1003 is not the brightness threshold set in step S1001 or lower, the CPU 26 returns the processing to step S1004.

Steps S1006 to S1010 are similar to the above-described steps S1006 to S1010, and hence the description thereof is omitted.

In step S1011, the CPU 26 instructs the optical filter driving circuit 24 to remove the optical filter 4 from the optical path of the imaging optical system 2. Accordingly, the imaging apparatus 1000 executes the infrared imaging.

As described above, if the SetImagingSettings command received by the I/F 14 describes only one value of the case in which the optical filter 4 is inserted and the case in which the optical filter 4 is removed, the imaging apparatus 1000 according to this embodiment automatically determines the other value.

In this case, SetImagingSettings includes the value of the BoundaryType field relating to ToOn and ToOff. However, both values may not be normally described in a command which is received through a network. Hence, only one value may be described. Owing to this, if setting is not made as the user intends, the imaging apparatus 1000 may not receive the other value.

However, even in this case, the imaging apparatus 1000 has to be properly operated based on the setting made by the external apparatus without a phenomenon in which the optical filter is unintentionally inserted into or removed from the optical path of the imaging optical system, or a phenomenon in which a captured image becomes abnormal.

As described above, if the SetImagingSettings command describes only one value of the case in which the optical filter 4 is inserted and the case in which the optical filter 4 is removed, the imaging apparatus 1000 automatically determines the other value.

Accordingly, the imaging apparatus 1000 can be properly operated even if only one value is set. Consequently, when setting relating to insertion and removal control of the optical filter is executed from the external apparatus through the network, the degree of freedom of setting relating to the brightness of the object of the imaging apparatus, the delay time relating to insertion and removal of the optical filter, etc., can be increased.

Also, in this embodiment, the CPU 26 determines whether or not only one value of the case in which the optical filter 4 is inserted and the case in which the optical filter 4 is removed is described in the SetImagingSettings command. Therefore, the automatic determining operation can be executed at a proper timing in accordance with the received command.

Alternatively, in this embodiment, if it is determined that only one value of the case in which the optical filter 4 is inserted and the case in which the optical filter 4 is removed is described, the other value may not be automatically determined until a predetermined time elapses in step S904 and step S906 shown in FIG. 10.

That is, the operation according to this embodiment may be executed if the SetImagingSettings command having the other value described therein is not received although the predetermined time has elapsed.

Alternatively, in this embodiment, if it is determined that only one value of the case in which the optical filter 4 is inserted and the case in which the optical filter 4 is removed is described, a notification for urging additional setting of the other value may be provided to the client apparatus 2000 in step S904 and step S906 shown in FIG. 10.

Second Embodiment

Next, a second embodiment of the invention is described with reference to FIGS. 13 and 14. The same reference signs are applied to the same components as those of the above-described embodiment, and the description thereof is occasionally omitted.

In the above-described first embodiment, the operation of the imaging apparatus when only the value corresponding to the BoundaryType field of ToOn or ToOff is described in the command has been exemplified.

Figure 13:
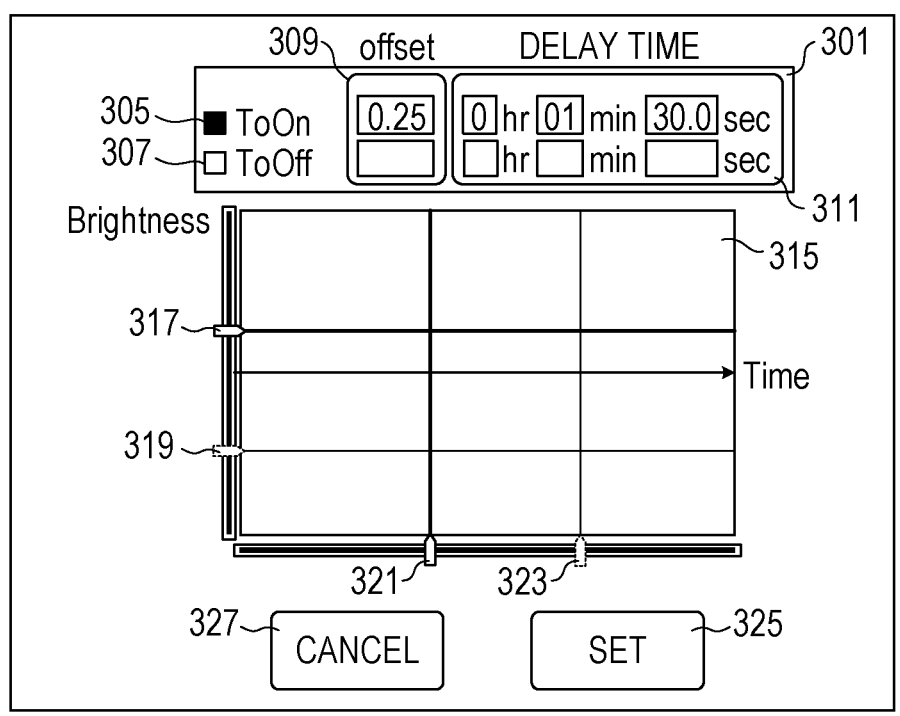
FIG. 13 is an illustration showing an example of a setting screen according to a second embodiment of the invention.

FIG. 13 is an illustration showing an example of an IrCutFilterAutoAdjustment setting screen of the client apparatus 2000 according to this embodiment. This screen is displayed on the display 422.

An optical filter type selection pane 301 in FIG. 13 includes a ToOn selection checkbox 305, a ToOff selection checkbox 307, and a BoundaryOffset setting numerical box 309.

Also, the optical filter type selection pane 301 includes a delay time setting numerical box 311. An optical filter setting pane 315 includes a first brightness threshold setting scale 317, a second brightness threshold setting scale 319, a first delay time setting scale 321, and a second delay time setting scale 323. Further, the setting screen shown in FIG. 13 is provided with a set button 325 and a cancel button 327.

In the optical filter setting pane 315, the vertical axis represents the brightness value and the horizontal axis represents the delay time. In particular, in the optical filter setting pane 315, the value on the horizontal axis (the value on Time axis) represents a brightness value being 0 (zero), and the upper limit (upper end) represents a normalized brightness value of 1.0. Also, the lower limit (lower end) represents a normalized brightness value of −1.0. Also, in the optical filter setting pane 315, the left limit (left end) represents a delay time of 0 (zero).

Also, FIG. 13 is an example of a setting screen when the optical filter 4 is inserted into the optical path of the imaging optical system 2. That is, the screen in FIG. 13 is a setting screen used when the SetImagingSettings command in which the BoundaryType field with the value being ToOn is described is transmitted to the imaging apparatus 1000.

The ToOn selection checkbox 305 in FIG. 13 is selected by the user. Owing to this, the second brightness threshold setting scale 319 and the second delay time setting scale 323 are grayed out. That is, the second brightness threshold setting scale 319 and the second delay time setting scale 323 are in an inoperable state.

The user sets a desirable value of BoundaryOffset by sliding the first brightness threshold setting scale 317 up and down. If the first brightness threshold setting scale 317 is operated by the user, the value of a ToOn correspondence portion in the BoundaryOffset setting numerical box 309 is changed in association with this operation.

Also, the user may directly input a value in the ToOn correspondence portion in the BoundaryOffset setting numerical box 309. When the user inputs a value in this ToOn correspondence portion, the first brightness threshold setting scale 317 moves up and down in accordance with the input value.

In this way, the user can roughly recognize the value of BoundaryOffset with reference to the position of the first brightness threshold setting scale 317. Further, since the position is associated with the value of the ToOn correspondence portion in the BoundaryOffset setting numerical box 309, the user can correctly recognize the value of BoundaryOffset according to the ToOn correspondence portion.

If the set button 325 is pressed while the first brightness threshold setting scale 317 is arranged on the Time axis, the client apparatus 2000 transmits the SetImagingSettings command in which the BoundaryOffset field is omitted.

Similarly, even if the set button 325 is pressed while 0 (zero) is input in the ToOn correspondence portion in the BoundaryOffset setting numerical box 309, the client apparatus 2000 transmits the SetImagingSettings command with the omission.

For example, a configuration may be provided such that a graphical user interface (GUI) component for instructing the omission of the BoundaryOffset field in the SetImagingSettings command is additionally displayed on the display 422.

Specifically, a checkbox for omission of the BoundaryOffset field is arranged on the screen in FIG. 13, as such a GUI component. Then, the BoundaryOffset field of the SetImagingSettings command may be omitted if this checkbox is selected by the user.

Also, the user sets a desirable value of ResponseTime by sliding the first delay time setting scale 321 left and right. If the first delay time setting scale 321 is operated by the user, the time indication of a ToOn correspondence portion in the delay time setting numerical box 311 is changed in accordance with this operation.

Also, the user may directly input a value in the ToOn correspondence portion in the delay time setting numerical box 311. When the user inputs a value in this ToOn correspondence portion, the first delay time setting scale 321 moves left and right in accordance with the input value.

A situation in which the set button 325 is pressed while the first delay time setting scale 321 is arranged at the left end of the optical filter setting pane 315 is expected. In this case, the client apparatus 2000 transmits the SetImagingSettings command in which the ResponseTime field is omitted.

Similarly, a situation in which the set button 325 is pressed while 0 (zero) is input in all numerical boxes of the ToOn correspondence portion in the delay time setting numerical box 311 is expected. Even in this case, the client apparatus 2000 transmits the SetImagingSettings command in which the ResponseTime field is omitted.

In this embodiment, the omission of the ResponseTime field can be instructed by arranging the first delay time setting scale 321 at the left end of the optical filter setting pane 315 or inputting zero in the ToOn correspondence portion in the delay time setting numerical box 311. However, it is not limited thereto.

For example, a configuration may be provided such that a GUI component for instructing the omission of the ResponseTime field in the SetImagingSettings command is additionally displayed on the display 422.

Specifically, a checkbox for omission of the ResponseTime field is arranged on the screen in FIG. 13, as such a GUI component. Then, the ResponseTime field of the SetImagingSettings command may be omitted if this checkbox is selected by the user.

Also, the client apparatus 2000 according to this embodiment may transmit the GetOptions command to the imaging apparatus 1000 before the setting screen in FIG. 13 is displayed on the display 422. Then, the client apparatus 2000 may update the setting screen in FIG. 13 displayed on the display 422 in accordance with GetOptionsResponse transmitted from the imaging apparatus 1000.

In this case, this response includes the IrCutFilterAutoAdjustmetOptions field. In this filed, a value of the BoundaryType field etc. which can be received by the imaging apparatus 1000 is described.

Also, in this embodiment, the example relating to ToOn has been provided. However, a similar operation is provided even if the ToOff selection checkbox 307 in FIG. 13 is selected by the user. Hence, by operating, for example, the second brightness threshold setting scale 319 and the second delay time setting scale 323, the similar operation may be provided.

Figure 14:
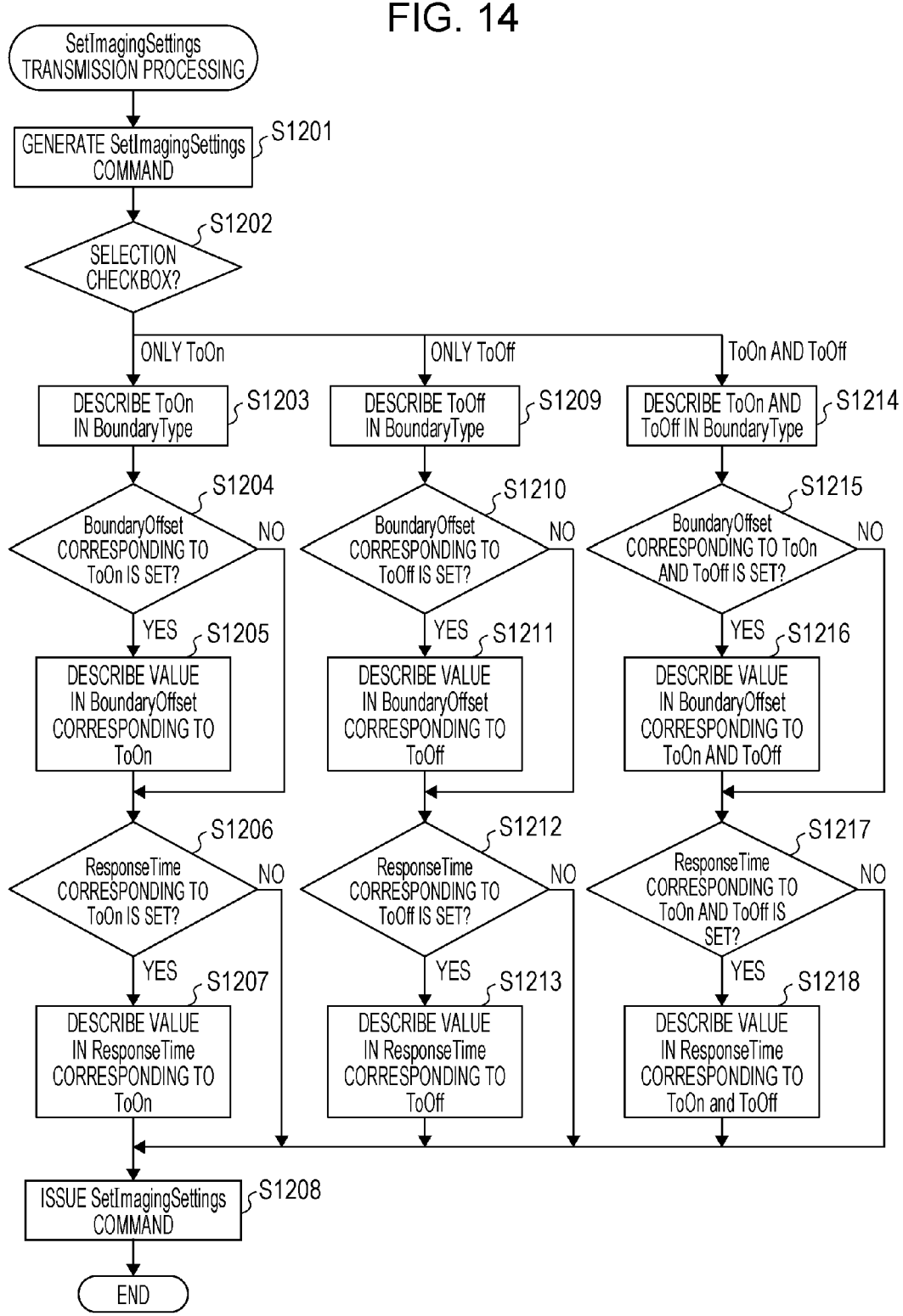
FIG. 14 is a flowchart for describing SetImagingSettings transmission processing according to the second embodiment of the invention.

Next, FIG. 14 is a flowchart for describing SetImagingSettings transmission processing in the client apparatus 2000 according to this embodiment.

This processing is executed by the CPU 426. The CPU 426 determines whether or not the set button 325 is pressed. If it is determined that the set button 325 is pressed, the CPU 426 starts this processing. If it is determined that the set button 325 is not pressed, the CPU 426 does not start this processing.

In step S1201, the CPU 426 generates the SetImagingSettings command, and causes the EEPROM 428 to store the generated SetImagingSettings command. The value of the IrCutFilter field in the stored SetImagingSettings command is AUTO.

Accordingly, as shown in FIGS. 9A and 9B, the <IrCutFilter> tag of the stored SetImagingSettings command is associated with AUTO.

In step S1202, the CPU 426 determines whether or not the ToOn selection checkbox 305 or the ToOff selection checkbox 307 is selected.

Then, if it is determined that only the ToOn selection checkbox 305 is selected, the CPU 426 advances the processing to step S1203. If it is determined that only the ToOff selection checkbox 307 is selected, the CPU 426 advances the processing to step S1209. If it is determined that both the ToOn selection checkbox 305 and the ToOff selection checkbox 307 are selected, the CPU 426 advances the processing to step S1214. In step S1203, the CPU 426 adds the BoundaryType field with the value being ToOn to the command stored in step S1201.

Accordingly, as shown in FIG. 9A, the <IrCutFilterAutoAdjustment> tag is described in the stored command. Further, the <BoundaryType> tag is associated with this <IrCutFilterAutoAdjustment> tag and described in this command.

Further, ToOn is associated with this <BoundaryType> tag and described in this command.

In step S1204, the CPU 426 determines whether or not a value is set in the ToOn correspondence portion in the BoundaryOffset setting numerical box 309. If it is determined that a value is set in the ToOn correspondence portion in the BoundaryOffset setting numerical box 309, the CPU 426 advances the processing to step S1205.

In contrast, if it is determined that a value is not set in the ToOn correspondence portion in the BoundaryOffset setting numerical box 309, the CPU 426 advances the processing to step S1206.

In step S1205, the CPU 426 adds the BoundaryOffset field to the command stored in step S1201. The value of this BoundaryOffset field is a value set in the ToOn correspondence portion in the BoundaryOffset setting numerical box 309.

Accordingly, as shown in FIG. 9A, the <BoundaryOffset> tag is associated with the <IrCutFilterAutoAdjustment> tag and is described in the stored command. Further, 0.25 is associated with the <BoundaryOffset> tag and is described in this command.

In step S1206, the CPU 426 determines whether or not a value is set in the ToOn correspondence portion in the delay time setting numerical box 311. If it is determined that a value is set in the ToOn correspondence portion in the delay time setting numerical box 311, the CPU 426 advances the processing to step S1207.

In contrast, if it is determined that a value is not set in the ToOn correspondence portion in the delay time setting numerical box 311, the CPU 426 advances the processing to step S1208.

In step S1207, the CPU 426 adds the ResponseTime field to the command stored in step S1201. The value of this ResponseTime field is a value set in the ToOn correspondence portion in the delay time setting numerical box 311.

Accordingly, for example, as shown in FIG. 9A, the <ResponseTime> tag is associated with the <IrCutFilterAutoAdjustment> tag and is described in the stored command. Further, PT1M15S is associated with the <ResponseTime> tag and is described in this command.

In step S1208, the CPU 426 instructs the I/F 414 to transmit the command stored in step S1201 to the imaging apparatus 1000.

In step S1209, the CPU 426 adds the BoundaryType field with the value being ToOff to the command stored in step S1201.

Accordingly, as shown in FIG. 9B, the <IrCutFilterAutoAdjustment> tag is described in the stored command. Further, the <BoundaryType> tag is associated with this <IrCutFilterAutoAdjustment> tag and described in this command.

Further, ToOff is associated with this <BoundaryType> tag and described in this command.

In step S1210, the CPU 426 determines whether or not a value is set in the ToOff correspondence portion in the BoundaryOffset setting numerical box 309. If it is determined that a value is set in the ToOff correspondence portion in the BoundaryOffset setting numerical box 309, the CPU 426 advances the processing to step S1211.

In contrast, if it is determined that a value is not set in the ToOff correspondence portion in the BoundaryOffset setting numerical box 309, the CPU 426 advances the processing to step S1212.

In step S1211, the CPU 426 adds the BoundaryOffset field to the command stored in step S1201. The value of this BoundaryOffset field is a value set in the ToOff correspondence portion in the BoundaryOffset setting numerical box 309.

Accordingly, as shown in FIG. 9B, the <BoundaryOffset> tag is associated with the <IrCutFilterAutoAdjustment> tag and is described in the stored command. Further, 0.16 is associated with the <BoundaryOffset> tag and is described in this command.

In step S1212, the CPU 426 determines whether or not a value is set in the ToOff correspondence portion in the delay time setting numerical box 311. If it is determined that a value is set in the ToOff correspondence portion in the delay time setting numerical box 311, the CPU 426 advances the processing to step S1213.

In contrast, if it is determined that a value is not set in the ToOff correspondence portion in the delay time setting numerical box 311, the CPU 426 advances the processing to step S1208.

In step S1213, the CPU 426 adds the ResponseTime field to the command stored in step S1201. The value of this ResponseTime field is a value set in the ToOff correspondence portion in the delay time setting numerical box 311.

Accordingly, for example, as shown in FIG. 9B, the <ResponseTime> tag is associated with the <IrCutFilterAutoAdjustment> tag and is described in the stored command. Further, PT1M10S is associated with the <ResponseTime> tag and is described in this command.

In step S1208, the CPU 426 instructs the I/F 414 to transmit the command stored in step S1201 to the imaging apparatus 1000.

In step S1214, the CPU 426 adds the BoundaryType field with the values being ToOn and ToOff to the command stored in step S1201. Further, ToOn and ToOff are associated with this <BoundaryType> tag and described in this command.

In step S1215, the CPU 426 determines whether or not values are set in the ToOn and ToOff correspondence portions in the BoundaryOffset setting numerical box 309. If it is determined that values are set in the ToOn and ToOff correspondence portions in the BoundaryOffset setting numerical box 309, the CPU 426 advances the processing to step S1216.

In contrast, if it is determined that values are not set in the ToOn and ToOff correspondence portions in the BoundaryOffset setting numerical box 309, the CPU 426 advances the processing to step S1217.

In step S1216, the CPU 426 adds the BoundaryOffset field to the command stored in step S1201. The values of this BoundaryOffset field are values set in the ToOn and ToOff correspondence portions of the BoundaryOffset setting numerical box 309.

In step S1217, the CPU 426 determines whether or not values are set in the ToOn and ToOff correspondence portions in the delay time setting numerical box 311. If it is determined that values are set in the ToOn and ToOff correspondence portions in the delay time setting numerical box 311, the CPU 426 advances the processing to step S1218.

In contrast, if it is determined that a value is not set in the ToOn or ToOff correspondence portion in the delay time setting numerical box 311, the CPU 426 advances the processing to step S1208.

In step S1218, the CPU 426 adds the ResponseTime field to the command stored in step S1201. The values of this ResponseTime field are values set in the ToOn and ToOff correspondence portions of the delay time setting numerical box 311.

In step S1208, the CPU 426 instructs the I/F 414 to transmit the command stored in step S1201 to the imaging apparatus 1000.

In step S1215, if it is determined that a value corresponding to ToOn or ToOff is not set in the BoundaryOffset setting numerical box 309, a field of an item which is not set is not added.

Also, in step S1217, if it is determined that a value corresponding to ToOn or ToOff is not set in the delay time setting numerical box 311, a field of an item which is not set is not added.

Next, display processing when the client apparatus 2000 receives GetImagingSettingsResponse is described with reference to FIGS. 15 to 17.

Figure 15:
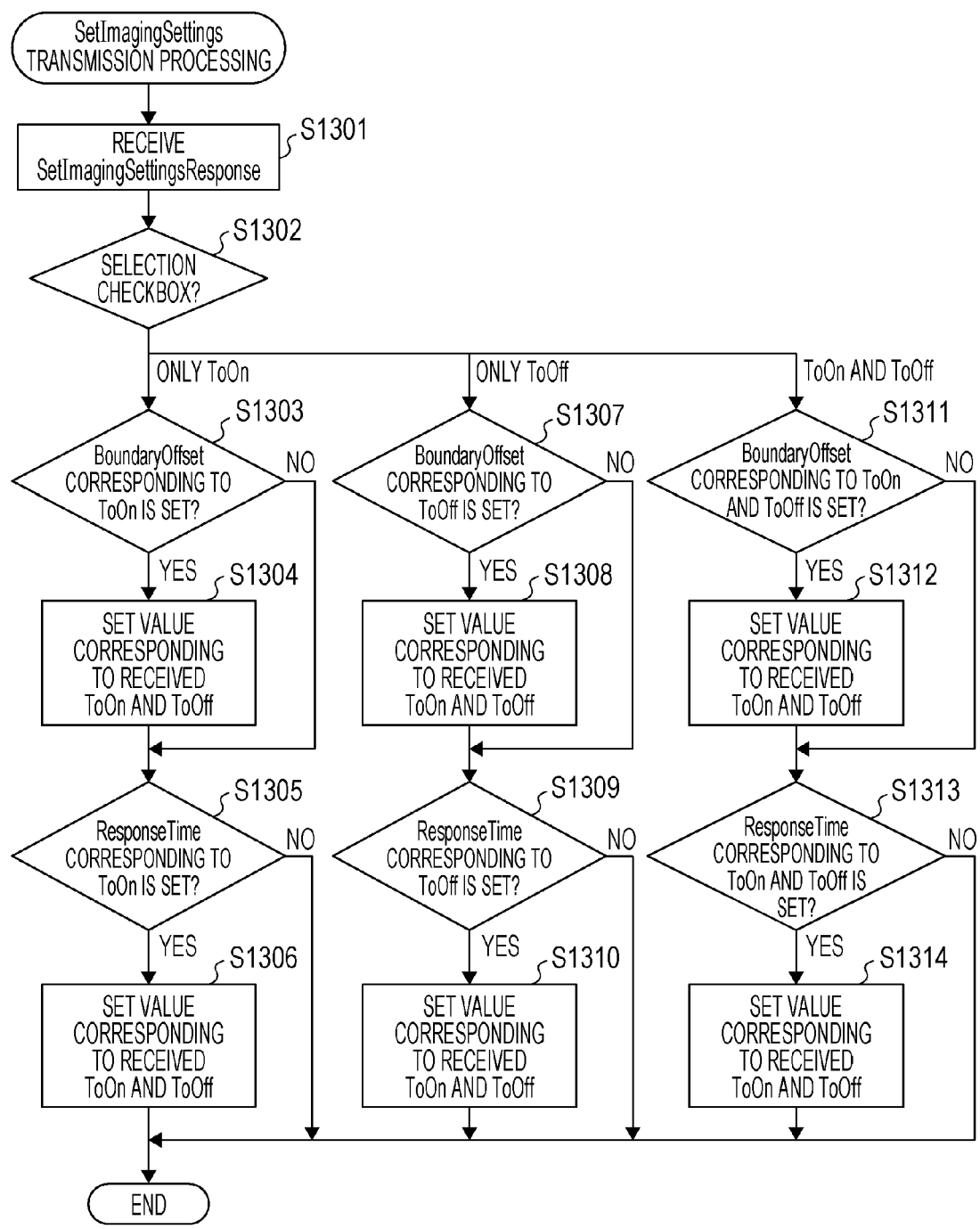
FIG. 15 is a flowchart for describing display processing according to the second embodiment of the invention.

FIG. 15 is a flowchart showing an example of display processing in the client apparatus 2000.

Figure 16A:
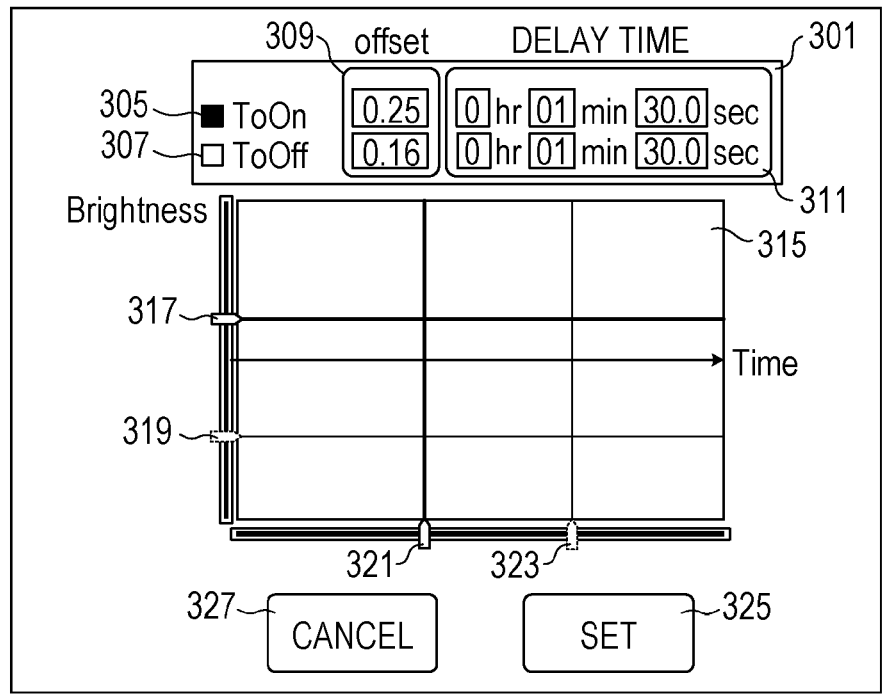
FIGS. 16A and 16B are illustrations each showing an example for describing the display processing according to the second embodiment of the invention.
Figure 16B:
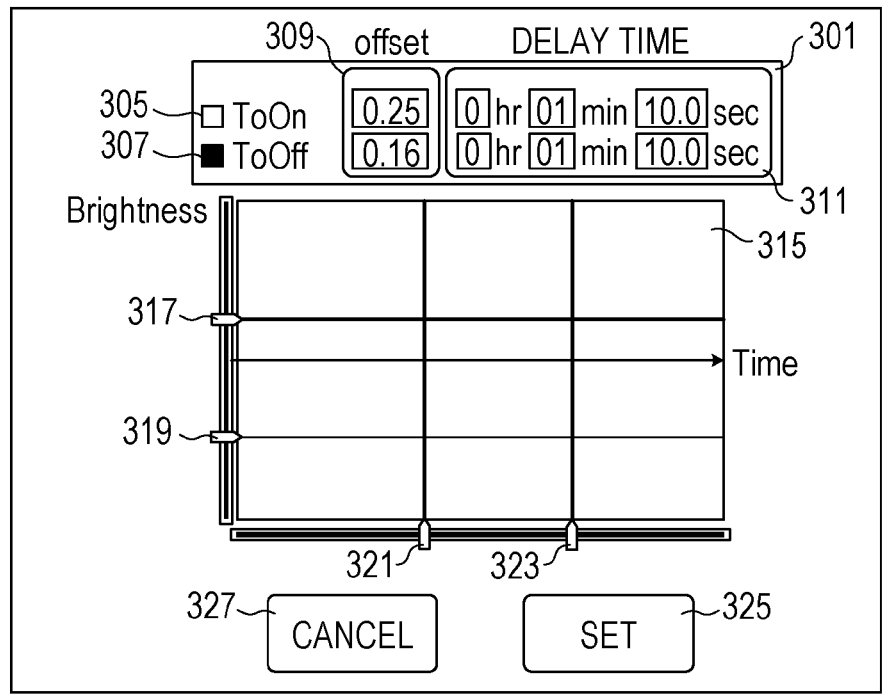

Configurations of respective portions in FIGS. 16A and 16B are similar to that in FIG. 13.

Figure 17:
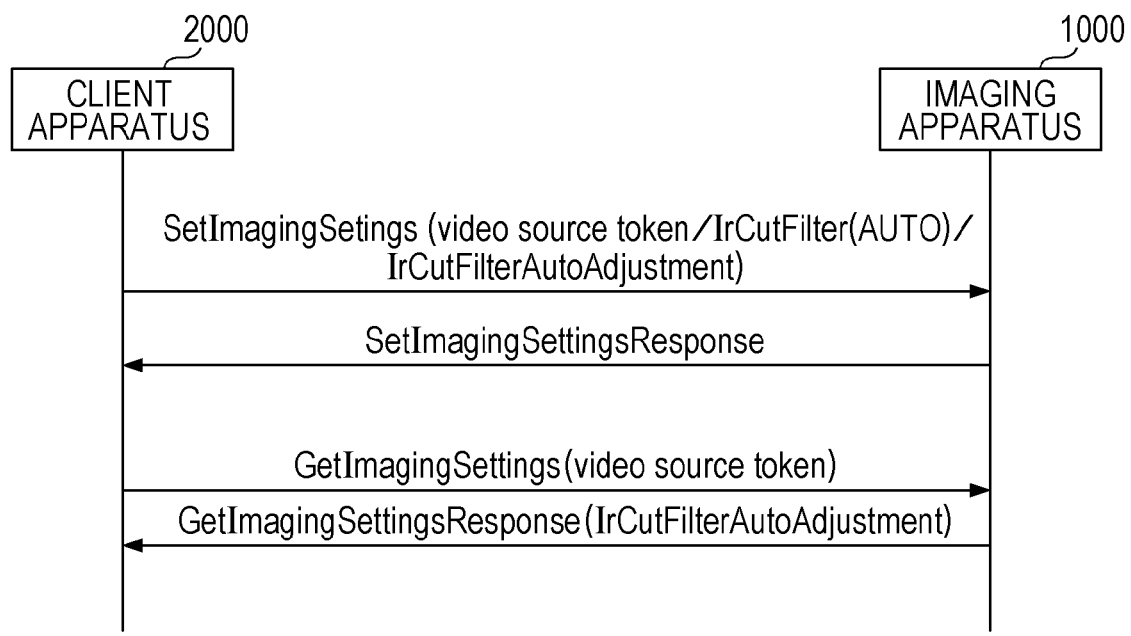
FIG. 17 is an illustration for describing a command sequence of the imaging apparatus and the client apparatus according to the second embodiment of the invention.

FIG. 17 is a sequence diagram of typical commands for indicating setting contents between the imaging apparatus 1000 and the client apparatus 2000.

Configurations including connection and transactions between the imaging apparatus 1000 and the client apparatus 2000 are similar to those in FIG. 6 according to the first embodiment.

Display processing according to the second embodiment is described now with reference to the flowchart in FIG. 15.

This processing is executed by the CPU 426. The CPU 426 starts execution of this processing when the CPU 426 receives the SetImagingSettingsResponse command from the imaging apparatus 1000 through the I/F 414. Also, it is assumed that SetImagingSettingsResponse command received by the I/F 414 is stored in the EEPROM 428.

First, in step S1301, the CPU 426 receives GetImagingSettingsResponse of the imaging apparatus 1000 for the GetImagingSettings command transmitted by the client apparatus 2000.

In step S1302, the CPU 426 determines whether or not the ToOn selection checkbox 305 or the ToOff selection checkbox 307 in the IrCutFilterAutoAdjustment setting screen is selected by the user.

If only the ToOn selection checkbox is selected, the processing goes to step S1303, and if only the ToOff selection checkbox is selected, the processing goes to step S1307. If both the ToOn selection checkbox and the ToOff selection checkbox are selected, the processing goes to step S1311.

In step S1303, the CPU 426 determines whether or not the value of BoundaryOffset of ToOn is set. If the value is set, the processing goes to step S1304, and if the value is not set, the processing goes to S1305.

In step S1304, the CPU 426 displays BoundaryOffset of ToOff corresponding to BoundaryOffset of ToOn described in GetImagingSettingsResponse. The value is indicated in the ToOff correspondence portion in the BoundaryOffset setting numerical box 309 in FIG. 16A.

At this time, regarding BoundaryOffset of ToOff, the brightness threshold corresponding to BoundaryOffset calculated by the imaging apparatus 1000 or acquired from a table may be described in GetImagingSettingsResponse. Alternatively, feedback may be made by using other command.

In step S1305, the CPU 426 determines whether or not ResponseTime of ToOn is set.

If it is determined that ResponseTime of ToOn is set, the CPU 426 advances the processing to step S1306. In contrast, if it is determined that ResponseTime of ToOn is not set, the CPU 426 ends the processing.

In step S1306, the CPU 426 displays ResponseTime of ToOff corresponding to ResponseTime of ToOn described in GetImagingSettingsResponse. The value is indicated in the ToOff correspondence portion in the delay time setting numerical box 311 in FIG. 16A.

At this time, regarding ResponseTime of ToOff corresponding to ResponseTime of ToOn, ResponseTime acquired by the imaging apparatus 1000 may be described in GetImagingSettingsResponse. Alternatively, the same value as ResponseTime of ToOn may be used.

In step S1307, the CPU 426 determines whether or not the value of BoundaryOffset of ToOff is set. If the value is set, the processing goes to step S1308, and if the value is not set, the processing goes to S1309.

In step S1308, the CPU 426 displays BoundaryOffset of ToOn corresponding to BoundaryOffset of ToOff described in GetImagingSettingsResponse. The value is indicated in the ToOn correspondence portion in the BoundaryOffset setting numerical box 309 in FIG. 16B.

At this time, regarding BoundaryOffset of ToOn, the brightness threshold corresponding to BoundaryOffset calculated by the imaging apparatus 1000 or acquired from a table may be described in GetImagingSettingsResponse. Alternatively, feedback may be made by using other command.

In step S1309, the CPU 426 determines whether or not ResponseTime of ToOff is set.

If it is determined that ResponseTime of ToOff is set, the CPU 426 advances the processing to step S1310. In contrast, if it is determined that ResponseTime of ToOff is not set, the CPU 426 ends the processing.

In step S1310, the CPU 426 displays ResponseTime of ToOn corresponding to ResponseTime of ToOff described in GetImagingSettingsResponse. The value is indicated in the ToOn correspondence portion in the delay time setting numerical box 311 in FIG. 16B.

At this time, regarding ResponseTime of ToOn corresponding to ResponseTime of ToOff, ResponseTime acquired by the imaging apparatus 1000 may be described in GetImagingSettingsResponse. Alternatively, the same value as ResponseTime of ToOff may be used.

In step S1311, the CPU 426 determines whether or not the values of BoundaryOffset of ToOn and ToOff are set. If the values are set, the processing goes to step S1312, and if the values are not set, the processing goes to S1313.

In step S1312, the CPU 426 displays BoundaryOffset corresponding to BoundaryOffset of ToOn and ToOff described in GetImagingSettingsResponse. The values are indicated in the BoundaryOffset setting numerical box 309.

In step S1313, the CPU 426 determines whether or not ResponseTime of ToOn and ToOff is set.

If ResponseTime of ToOn and ToOff is set, the processing goes to step S1314, and if ResponseTime of ToOn and ToOff is not set, the processing is ended.

In step S1313, the CPU 426 displays ResponseTime corresponding to ResponseTime of ToOn and ToOff described in GetImagingSettingsResponse, in the delay time setting numerical box 311.

As described above, this embodiment expects the following situation. That is, only the value of the BoundaryOffset field corresponding to the BoundaryType field of ToOn or ToOff is set. Even in this case, as shown in FIGS. 16A and 16B, a value corresponding to the BoundaryType field which is not selected can be indicated for the client apparatus. Owing to this, the client apparatus can recognize the setting of operation of the imaging apparatus.

The IrCutFilterAutoAdjustment setting screen according to this embodiment corresponds to a user interface for inputting a value such as the BoundaryOffset field described in the SetImagingSettings command.

As described above, the client apparatus 2000 or the external apparatus according to this embodiment can acquire the setting information automatically determined by the imaging apparatus, through the network.

In this case, SetImagingSettings in the command transmitted by the client apparatus 2000 includes the value of the BoundaryType field relating to ToOn and ToOff. However, both values may not be normally described in the command which is transmitted through the network.

In this case, if the SetImagingSettings command describes only one value of the case in which the optical filter 4 is inserted and the case in which the optical filter 4 is removed, the imaging apparatus 1000 according to this embodiment automatically determines the other value. Then, the client apparatus 2000 can receive the automatically determined setting information through the network.

Accordingly, the client apparatus 2000 can recognize the setting information of the imaging apparatus 1000 even through only one value is set. Consequently, when setting relating to insertion and removal control of the optical filter is executed through the network, the degree of freedom for setting relating to the brightness of the object of the imaging apparatus and the delay time relating to insertion and removal of the optical filter can be increased.

Also, in this embodiment, if only one value of the case in which the optical filter 4 is inserted and the case in which the optical filter 4 is removed is described, the client apparatus 2000 may cause the display 422 to display a warning for urging setting of the other value.

A specific warning method may be displaying an indication "automatically set the other?" or "please set the other" for a predetermined time, or causing the other setting item to blink for a predetermined time.

Third Embodiment

Next, a third embodiment of the invention is described with reference to FIG. 18. The same reference signs are applied to the same components as those of the above-described embodiments, and the description thereof is occasionally omitted.

In the above-described first and second embodiments, the operations of the imaging apparatus and the external apparatus when the adjustment value of ToOn or ToOff is described in the command have been exemplified.

Figure 18:
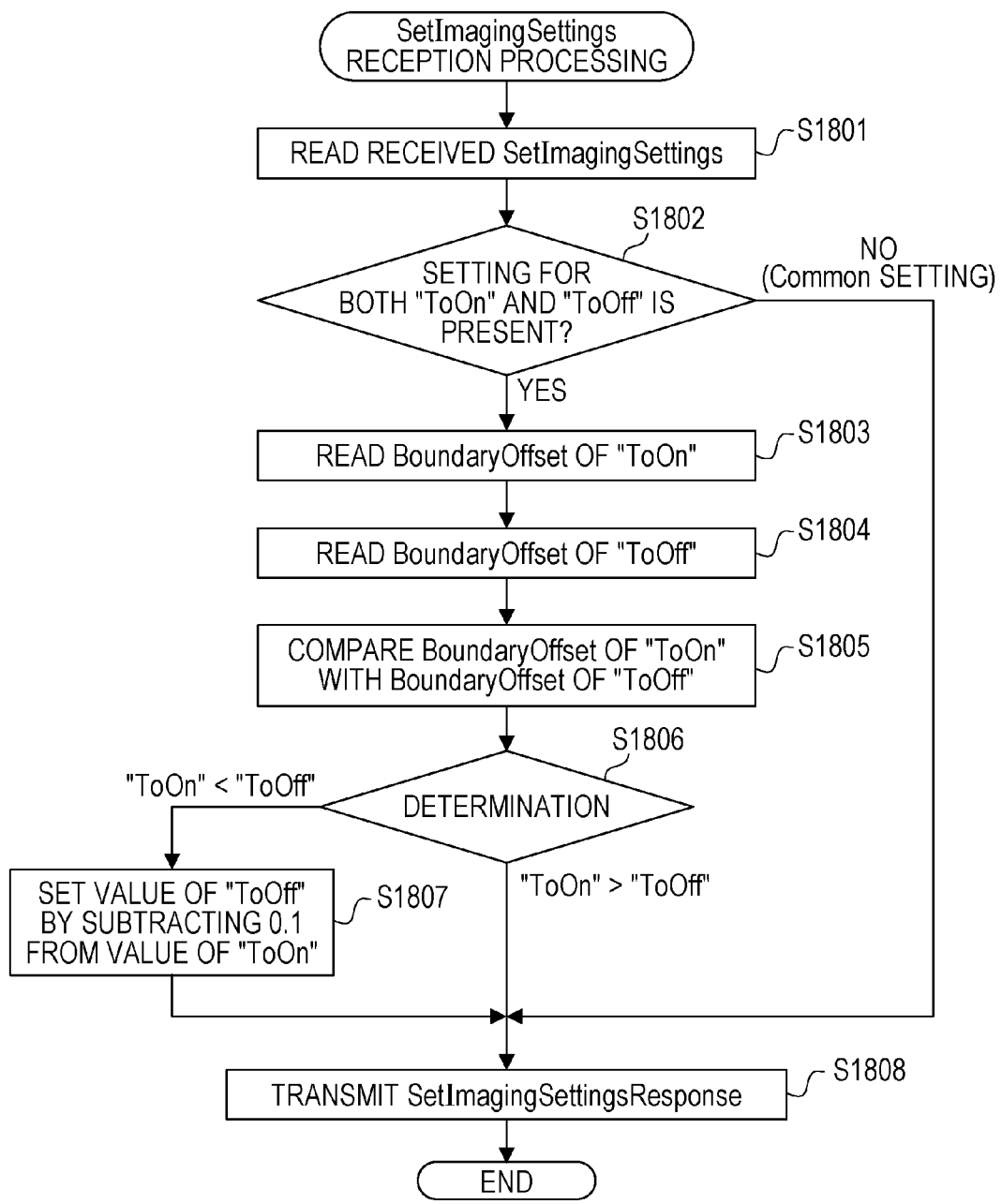
FIG. 18 is a flowchart for describing SetImagingSettings reception processing according to a third embodiment of the invention.

FIG. 18 is a flowchart for describing SetImagingSettings reception processing in the imaging apparatus 1000 according to this embodiment when the adjustment values of both ToOn and ToOff are described in the command.

This processing is executed by the CPU 26. The CPU 26 starts execution of this processing when the CPU 26 receives the SetImagingSettings command from the client apparatus 2000 through the I/F 14. Also, it is assumed that the SetImagingSettings command received by the I/F 14 is stored in the EEPROM 28.

In step S1801, the CPU 26 reads the SetImagingSettings command from the EEPROM 28.

In step S1802, the CPU 26 determines whether or not the BoundaryType field with the value being ToOn and the BoundaryType field with the value being ToOff are described in the command read in step S1801.

If it is determined that the BoundaryType field with the value being ToOn and the BoundaryType field with the value being ToOff are described, the CPU 26 advances the processing to step S1803. In contrast, if it is determined that the BoundaryType field with the value being ToOn and the BoundaryType field with the value being ToOff are not described, the CPU 26 advances the processing to step S1808.

Alternatively, the CPU 26 may advance the processing to step S1808 if it is determined that the BoundaryType field with a value being Common is described in the command read in step S1801.

In step S1803, the CPU 26 reads the value of the BoundaryOffset field corresponding to the BoundaryType field with the value being ToOn in the command read in step S1801.

In step S1804, the CPU 26 reads the value of the BoundaryOffset field corresponding to the BoundaryOffset field with the value being ToOff in the command read in step S1801.

In step S1805, the CPU 26 compares the value read in step S1803 with the value read in step S1804.

In step S1806, if it is determined that the value read in step S1803 is larger than the value read in step S1804 as the result of the comparison in step S1805, the CPU 26 causes the EEPROM 28 to store the brightness threshold.

To be more specific, the CPU 26 causes the EEPROM 28 to store the brightness threshold corresponding to the value read in step S1803, as the brightness threshold used for determining whether or not the optical filter 4 is inserted into the optical path of the imaging optical system 2.

Further, the CPU 26 causes the EEPROM 28 to store the brightness threshold corresponding to the value read in step S1804, as the brightness threshold used for determining whether or not the optical filter 4 is removed from the optical path of the imaging optical system 2. After the storage, the CPU 26 advances the processing to step S1808.

In contrast, if it is determined that the value read in step S1803 is smaller than the value read in step S1804 as the result of the comparison in step S1805, the CPU 26 advances the processing to step S1807.

In this embodiment, the SetImagingSettings command received by the I/F 14 is of course information required for the determination in step S1804 by the CPU 26.

In step S1807, the CPU 26 causes the EEPROM 28 to store the brightness value corresponding to the value read in step S1803, as the brightness threshold used for determining whether or not the optical filter 4 is inserted into the optical path of the imaging optical system 2.

Further, the CPU 26 causes the EEPROM 28 to store the brightness value corresponding to a value obtained by subtracting 0.1 from the value read in step S1803, as the brightness threshold used for determining whether or not the optical filter 4 is removed from the optical path of the imaging optical system 2.

That is, in this embodiment, based on one value (value read in step S1803), the CPU 26 automatically determines the other value (brightness threshold used for determination whether or not the optical filter 4 is removed from the optical path of the imaging optical system 2) in step S1807.

In step S1808, the CPU 26 instructs the I/F 14 to cause the client apparatus 2000 to transmit SetImagingSettingsResponse.

As described above, this embodiment expects the following situation. That is, the value of the BoundaryOffset field corresponding to the BoundaryType field with the value being ToOn is smaller than the value of the BoundaryOffset field of the BoundaryType field with the value being ToOff.

Even in this case, the imaging apparatus 1000 according to this embodiment can cause the value of the BoundaryOffset field to be smaller than the value of the BoundaryOffset field of the BoundaryType field with the value being ToOn.

Consequently, a phenomenon, in which the optical filter 4 is inserted into the optical path of the imaging optical system 2 although the brightness of the object is low and the object in the captured image becomes blackened by underexposure, can be prevented from occurring. Also, a phenomenon, in which the optical filter 4 is removed from the optical path of the imaging optical system 2 although the brightness of the object is high and the object in the captured image becomes whitened by overexposure, can be prevented from occurring.

Also, setting the value of the BoundaryOffset field of the BoundaryType field with the value being ToOff at a value smaller than the value of the BoundaryOffset field of the BoundaryType field with the value being ToOn is effective for ONVIF.

This is because ONVIF limits the ranges of values of the BoundaryOffset field when the optical filter 4 is inserted into the optical path of the imaging optical system 2 and when the optical filter 4 is removed from the optical path, to the same range (from −1.0 to +1.0).

Hence, setting the value of the BoundaryOffset field when the optical filter 4 is removed from the optical path of the imaging optical system 2 at a value larger than the value of the BoundaryOffset field when the optical filter 4 is inserted into the optical path is correct in view of ONVIF standard.

Therefore, the situation in which the SetImagingSettings command having described therein two BoundaryOffset fields is transmitted from the client apparatus being compliant with ONVIF standard may frequently occur.

The CPU 26 according to this embodiment causes the EEPROM 28 to store the value obtained by subtracting 0.1 from the value read in step S1803, as the brightness value used for determining whether or not the optical filter 4 is removed from the optical path of the imaging optical system 2 in step S1807. However, it is not limited thereto.

For example, the CPU 26 may cause the EEPROM 28 to store a value obtained by adding 0.1 to the value read in step S1804, as the brightness value used for determining whether or not the optical filter 4 is inserted into the optical path of the imaging optical system 2 in step S1807. Further, the CPU 26 may cause the EEPROM 28 to store the value read in step S1804, as the brightness value used for determining whether or not the optical filter 4 is removed from the optical path of the imaging optical system 2 in step S1807.

Also, in step S1807, the value subtracted from the value read in step S1803 (the value added to the value read in step S1804) is "0.1," however it is not limited thereto.

For example, the CPU 26 may receive a desirable value from the client apparatus 2000 operated by the user through the I/F 14, and apply the received value to the value to be subtracted from the value read in step S1803 (the value to be added to the value read in step S1804).

The value of ToOff is calculated in step S1807 in accordance with the determination result by the CPU 26 in step S1806; however, it is not limited thereto. In this case, an instruction may be provided to the I/F 14, so that the client apparatus 2000 transmits SetImagingSettingsResponse indicative of abnormality of the SetImagingSettings command received by the I/F 14.

Fourth Embodiment

Next, a fourth embodiment of the invention is described with reference to FIGS. 19A and 21. The same reference signs are applied to the same components as those of the above-described embodiments, and the description thereof is occasionally omitted.

The above-described third embodiment has expected the following situation. That is, the value of the BoundaryOffset field corresponding to the BoundaryType field with the value being ToOn is smaller than the value of the BoundaryOffset field corresponding to the BoundaryType field with the value being ToOff.

In contrast, the client apparatus 2000 according to the fourth embodiment notifies the user about incorrect setting of a value when each value of the BoundaryOffset field is set by the client apparatus 2000.

Accordingly, the user who operates the client apparatus 2000 can recognize the incorrect setting before transmission of the SetImagingSettings command in which each value of the BoundaryOffset field is not correctly set. The fourth embodiment is described below with regard to such a point.

Figure 19A:
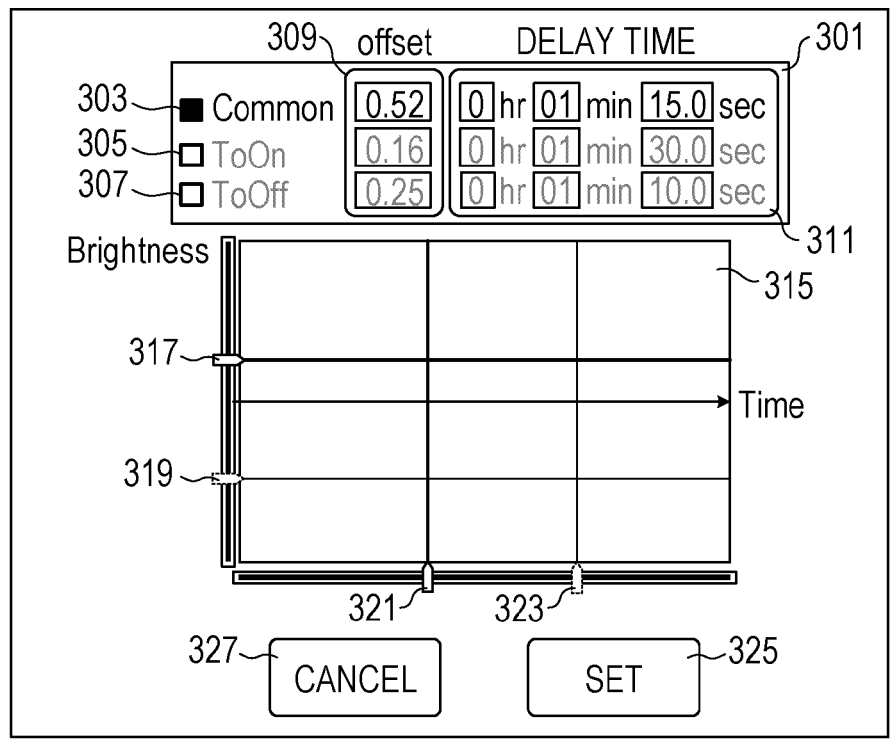
FIGS. 19A and 19B are illustrations each showing an example of a setting screen according to a fourth embodiment of the invention.
Figure 19B:
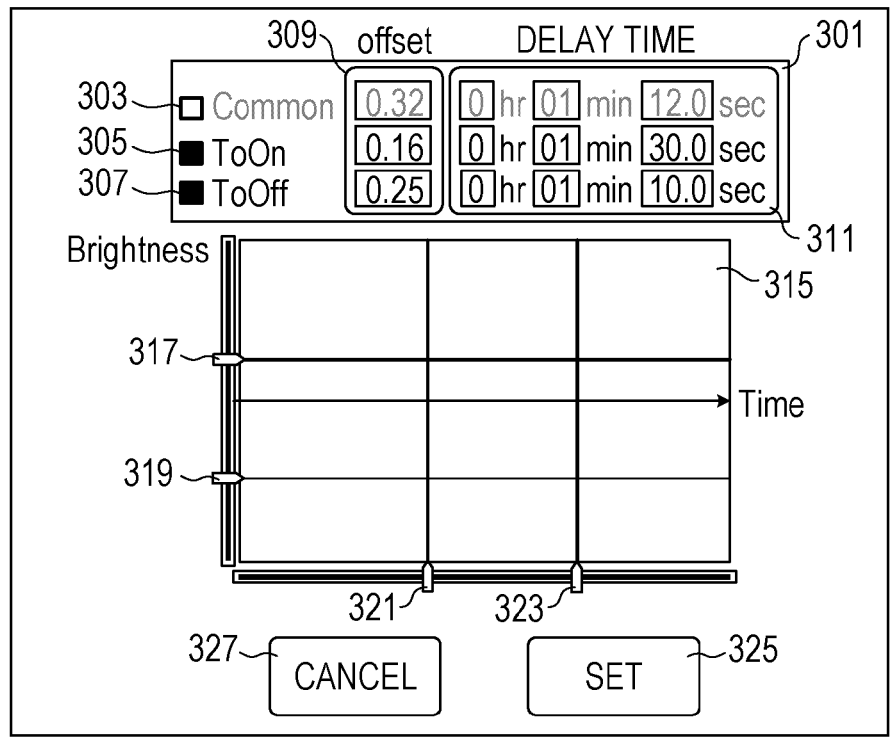

FIGS. 19A and 19B are illustrations each showing an example of an IrCutFilterAutoAdjustment setting screen of the client apparatus 2000 according to this embodiment. This screen is displayed on the display 422.

An optical filter type selection pane 301 in FIGS. 19A and 19B includes a Common selection checkbox 303 in addition to the panes in FIG. 13.

FIG. 19A is an example of a setting screen if the brightness threshold and delay time are commonly set for the case in which the optical filter 4 is inserted into the optical path of the imaging optical system 2 and the case in which the optical filter 4 is removed from the optical path of the imaging optical system 2.

That is, the screen in FIG. 19A is a setting screen used when the SetImagingSettings command in which the BoundaryType field with the value being Common is described is transmitted to the imaging apparatus 1000.

The Common selection checkbox 303 in FIG. 19A is selected by the user. Accordingly, the common brightness threshold and delay time are used by the imaging apparatus 1000 for each of the case in which the optical filter 4 is inserted into the optical path of the imaging optical system 2 and the case in which the optical filter 4 is removed from the optical path.

Owing to this, the second brightness threshold setting scale 319 and the second delay time setting scale 323 are grayed out. That is, the second brightness threshold setting scale 319 and the second delay time setting scale 323 are in an inoperable state.

The user sets a desirable value of BoundaryOffset by sliding the first brightness threshold setting scale 317 up and down. If the first brightness threshold setting scale 317 is operated by the user, the value of a Common correspondence portion in the BoundaryOffset setting numerical box 309 is changed in association with this operation.

Also, the user may directly input a value in the Common correspondence portion in the BoundaryOffset setting numerical box 309. When the user inputs a value in this Common correspondence portion, the first brightness threshold setting scale 317 moves up and down in accordance with the input value.

In this way, the user can roughly recognize the value of BoundaryOffset with reference to the position of the first brightness threshold setting scale 317. Further, since the position is associated with the value of the Common correspondence portion in the BoundaryOffset setting numerical box 309, the user can correctly recognize the value of BoundaryOffset with reference to the Common correspondence portion.

Similarly, even if the set button 325 is pressed while 0 (zero) is input in the Common correspondence portion in the BoundaryOffset setting numerical box 309, the client apparatus 2000 transmits the SetImagingSettings command with the omission.

Also, the user sets a desirable value of ResponseTime by sliding the first delay time setting scale 321 left and right. If the first delay time setting scale 321 is operated by the user, the time indication of a Common correspondence portion in the delay time setting numerical box 311 is changed in association with this operation.

Also, the user may directly input a value in the Common correspondence portion in the delay time setting numerical box 311. When the user inputs a time in this Common correspondence portion, the first delay time setting scale 321 moves left and right in accordance with the input time.

FIG. 19B is an example of a setting screen if the brightness threshold and delay time are individually set for the case in which the optical filter 4 is inserted into the optical path of the imaging optical system 2 and the case in which the optical filter 4 is removed from the optical path of the imaging optical system 2.

That is, the screen in FIG. 19B is a setting screen used when the SetImagingSettings command in which the BoundaryType field having described therein the two values of ToOn and ToOff is transmitted to the imaging apparatus 1000.

The ToOn selection checkbox 305 and the ToOff selection checkbox 307 in FIG. 19B are selected by the user. Accordingly, the brightness threshold and delay time are individually set for each of the case in which the optical filter 4 is inserted into the optical path of the imaging optical system 2 and the case in which the optical filter 4 is removed from the optical path.

Since the ToOn selection checkbox 305 is selected by the user, the first brightness threshold setting scale 317 and the first delay time setting scale 321 are effective (operable state). Also, since the ToOff selection checkbox 307 is selected by the user, the second brightness threshold setting scale 319 and the second delay time setting scale 323 are effective (operable state).

In the screen in each of FIGS. 19A and 19B, the Common selection checkbox 303, the ToOn selection checkbox 305, and the ToOff selection checkbox 307 cannot be simultaneously selected.

For example, if the Common selection checkbox 303 is selected by the user, the ToOn selection checkbox 305 and the ToOff selection checkbox 307 become an inoperable state.

Also, if one or both of the ToOn selection checkbox 305 and the ToOff selection checkbox 307 are selected by the user, the Common selection checkbox 303 becomes an inoperable state.

The client apparatus 2000 according to this embodiment may transmit the GetImagingSettings command to the imaging apparatus 1000 before the setting screen in any of FIGS. 19A and 19B is displayed on the display 422. Then, the client apparatus 2000 may update the setting screen in any of FIGS. 19A and 19B displayed on the display 422 in accordance with GetImagingSettingsResponse transmitted from the imaging apparatus 1000.

In this case, this response includes the IrCutFilterAutoAdjustment field. This field has described therein the current value of the BoundaryType field, the current value of the BoundaryOffset field, and the current value of the ResponseTime field of the imaging apparatus 1000.

For example, if the value of the BoundaryType field of GetImagingSettingsResponse received from the imaging apparatus 1000 is only Common, the client apparatus 2000 brings the Common selection checkbox 303 into the selected state.

Further, in this case, the client apparatus 2000 causes the value of the BoundaryOffset field included in this response to be indicated in the Common correspondence portion in the BoundaryOffset setting numerical box 309.

In addition, in this case, the client apparatus 2000 causes the value of the ResponseTime field included in this response to be indicated in the Common correspondence portion in the delay time setting numerical box 311.

Also, if the value of the BoundaryType field of GetImagingSettingsResponse received from the imaging apparatus 1000 is only ToOn and ToOff, the client apparatus 2000 brings the ToOn selection checkbox 305 into the selected state. Further, the client apparatus 2000 brings the ToOff selection checkbox 307 into the selected state.

Also, in this case, the client apparatus 2000 causes the value of the BoundaryOffset field corresponding to the BoundaryType field with the value being ToOn in this response to be indicated on the screen in FIG. 19B. To be more specific, the client apparatus 2000 causes this value to be indicated in the ToOn correspondence portion in the BoundaryOffset setting numerical box 309.

Then, in this case, the client apparatus 2000 causes the value of the BoundaryOffset field corresponding to the BoundaryType field with the value being ToOff in this response to be indicated on the screen in FIG. 19B. To be more specific, the client apparatus 2000 causes this value to be indicated in the ToOff correspondence portion in the BoundaryOffset setting numerical box 309.

Also, in this case, the client apparatus 2000 causes the value of the ResponseTime field corresponding to the BoundaryType field with the value being ToOn in this response to be indicated in the ToOn correspondence portion in the delay time setting numerical box 311.

Further, in this case, the client apparatus 2000 causes the value of the ResponseTime field corresponding to the BoundaryType field with the value being ToOff in this response to be indicated in the ToOff correspondence portion in the delay time setting numerical box 311.

When the set button 325 is pressed by the user, the client apparatus 2000 notifies the user about an error if setting of BoundaryOffset is improper, by indicating a popped up dialogue or the like.

Figure 20:
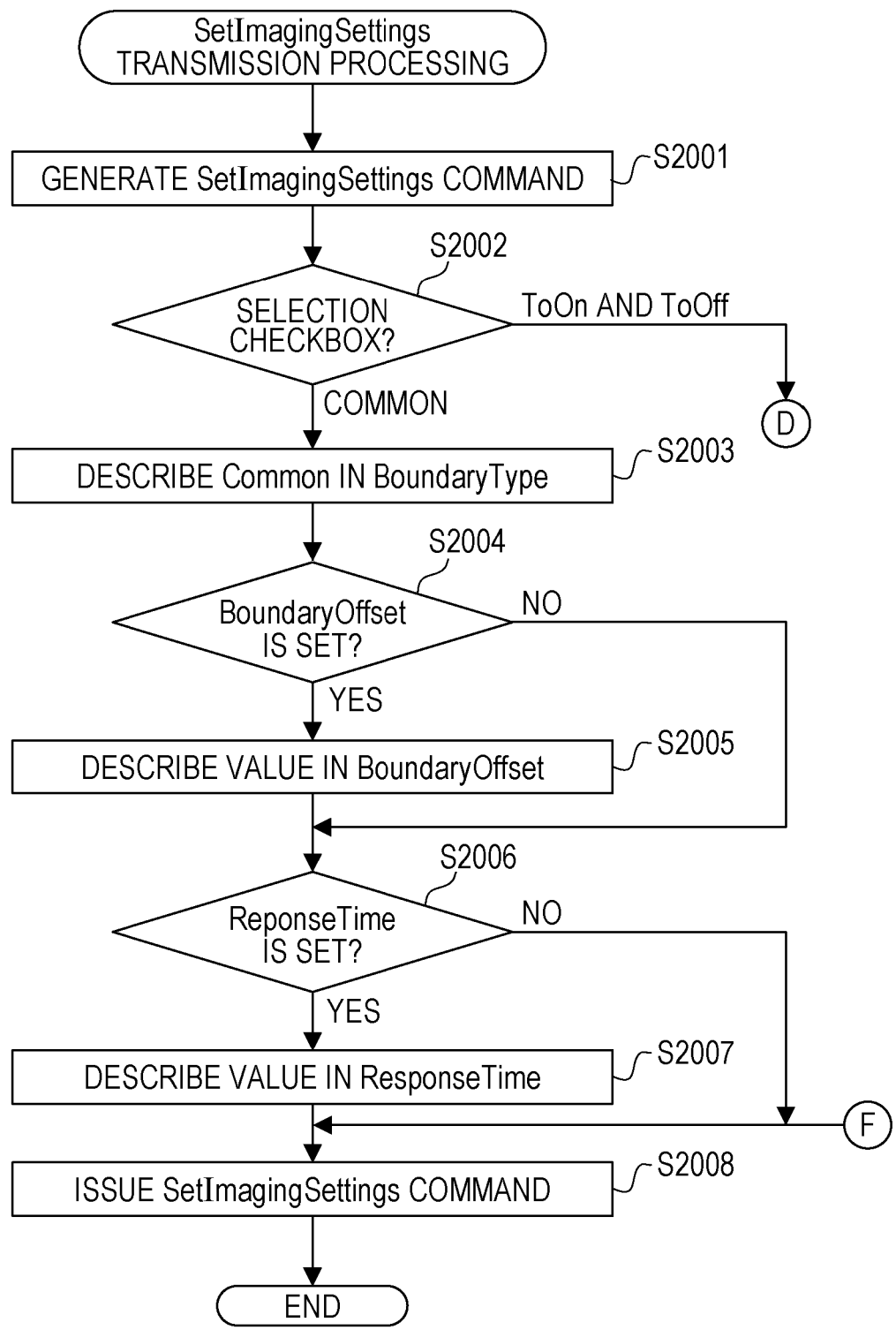
FIG. 20 is a flowchart for describing SetImagingSettings transmission processing according to the fourth embodiment of the invention.
Figure 21:
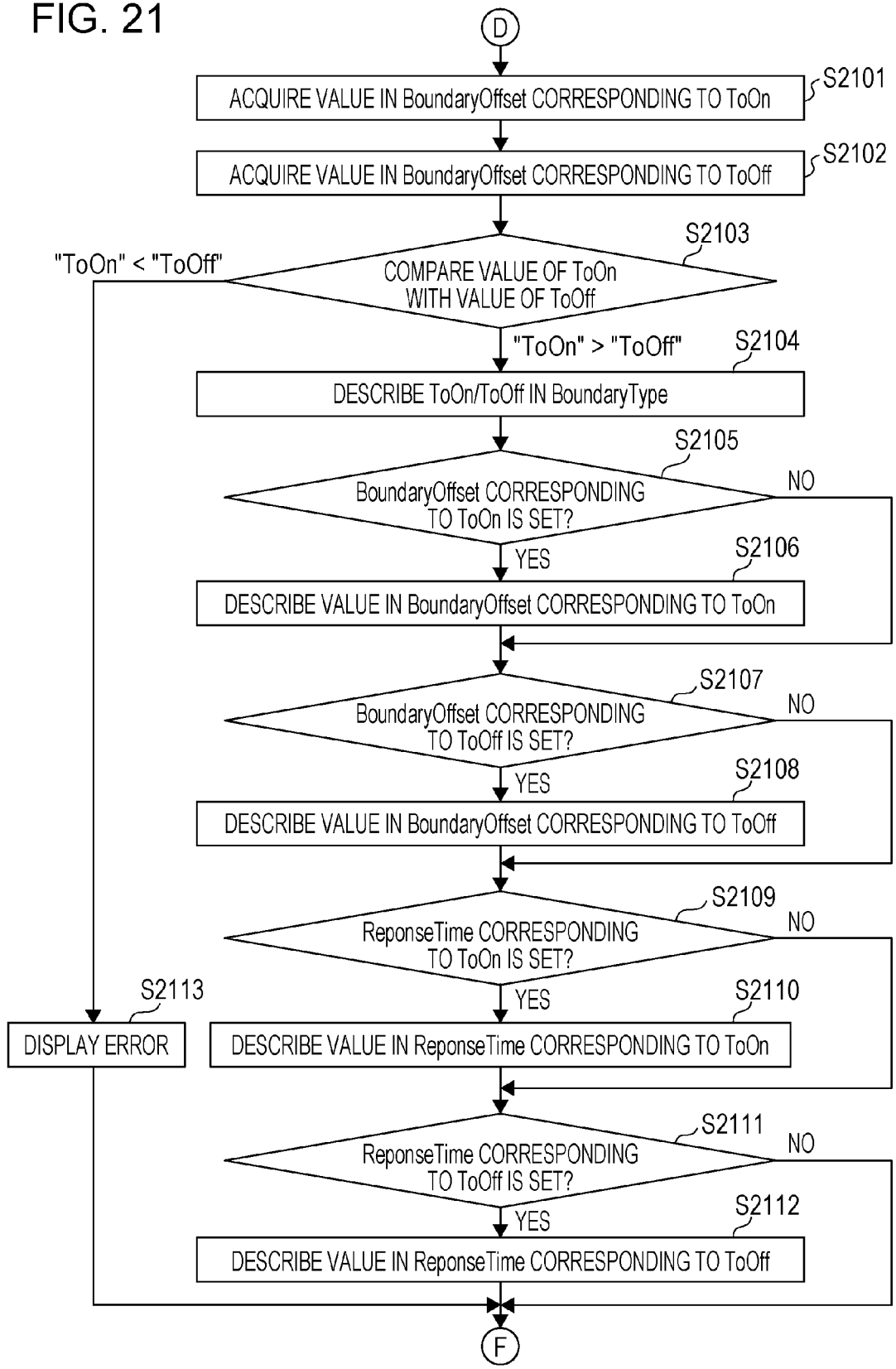
FIG. 21 is a flowchart for describing SetImagingSettings transmission processing according to the fourth embodiment of the invention.

Next, FIGS. 20 and 21 are flowcharts each for describing SetImagingSettings transmission processing in the client apparatus 2000 according to this embodiment.

This processing is executed by the CPU 426. The CPU 426 determines whether or not the set button 325 is pressed. If it is determined that the set button 325 is pressed, the CPU 426 starts this processing. If it is determined that the set button 325 is not pressed, the CPU 426 does not start this processing.

In step S2001, the CPU 426 generates the SetImagingSettings command, and causes the EEPROM 428 to store the generated SetImagingSettings command. The value of the IrCutFilter field in the stored SetImagingSettings command is AUTO.

In step S2002, the CPU 426 determines whether the Common selection checkbox 303 is selected, or the ToOn selection checkbox 305 and the ToOff selection checkbox 307 are selected.

Then, if it is determined that the Common selection checkbox 303 is selected, the CPU 426 advances the processing to step S2003. In contrast, if it is determined that the ToOn selection checkbox 305 and the ToOff selection checkbox 307 are selected, the CPU 426 advances the processing to step S2101.

In step S2103, the CPU 426 adds the BoundaryType field with the value being Common to the command stored in step S2001.

In step S2004, the CPU 426 determines whether or not a value is set in the Common correspondence portion in the BoundaryOffset setting numerical box 309. If it is determined that a value is set in the Common correspondence portion in the BoundaryOffset setting numerical box 309, the CPU 426 advances the processing to step S2005.

In contrast, if it is determined that a value is not set in the Common correspondence portion in the BoundaryOffset setting numerical box 309, the CPU 426 advances the processing to step S2006.

In step S2005, the CPU 426 adds the BoundaryOffset field to the command stored in step S2001. The value of this BoundaryOffset field is a value set in the Common correspondence portion in the BoundaryOffset setting numerical box 309.

In step S2006, the CPU 426 determines whether or not a value is set in the Common correspondence portion in the delay time setting numerical box 311. If it is determined that a value is set in the Common correspondence portion in the delay time setting numerical box 311, the CPU 426 advances the processing to step S2007.

In contrast, if it is determined that a value is not set in the Common correspondence portion in the delay time setting numerical box 311, the CPU 426 advances the processing to step S2008.

In step S2007, the CPU 426 adds the ResponseTime field to the command stored in step S2001. The value of this ResponseTime field is a value set in the Common correspondence portion in the delay time setting numerical box 311.

In step S2008, the CPU 426 instructs the I/F 414 to transmit the command stored in step S2001 to the imaging apparatus 1000.

Then, in step S2101 in FIG. 21, the CPU 426 acquires a value set in the ToOn correspondence portion in the BoundaryOffset setting numerical box 309.

If a value is not set in the ToOn correspondence portion in the BoundaryOffset setting numerical box 309, the CPU 426 may end the processing shown in FIGS. 20 and 21.

In step S2102, the CPU 426 acquires a value set in the ToOff correspondence portion in the BoundaryOffset setting numerical box 309.

If a value is not set in the ToOff correspondence portion in the BoundaryOffset setting numerical box 309, the CPU 426 may end the processing shown in FIGS. 20 and 21.

In step S2103, the CPU 426 determines whether or not the value acquired in step S2101 is larger than the value acquired in step S2102.

Then, if it is determined that the value acquired in step S2101 is larger than the value acquired in step S2102, the CPU 426 advances the processing to step S2104. In contrast, if it is determined that the value acquired in step S2101 is not larger than the value acquired in step S2102, the CPU 426 advances the processing to step S2113.

In step S2103, the CPU 426 determines whether or not the value acquired in step S2101 is larger than the value acquired in step S2102.

In step S2104, the CPU 426 adds the BoundaryType field with the value being ToOn and the BoundaryType field with the value being ToOff to the command stored in step S2001.

In step S2105, the CPU 426 determines whether or not a value is set in the ToOn correspondence portion in the BoundaryOffset setting numerical box 309. If it is determined that a value is set in the ToOn correspondence portion in the BoundaryOffset setting numerical box 309, the CPU 426 advances the processing to step S2106.

In contrast, if it is determined that a value is not set in the ToOn correspondence portion in the BoundaryOffset setting numerical box 309, the CPU 426 advances the processing to step S2107.

In step S2106, the CPU 426 adds the BoundaryOffset field to the command stored in step S2001. The value of this BoundaryOffset field is a value set in the ToOn correspondence portion in the BoundaryOffset setting numerical box 309. Further, this BoundaryOffset field is associated with the BoundaryType field with the value being ToOn.

In step S2107, the CPU 426 determines whether or not a value is set in the ToOff correspondence portion in the BoundaryOffset setting numerical box 309.

If it is determined that a value is set in the ToOff correspondence portion in the BoundaryOffset setting numerical box 309, the CPU 426 advances the processing to step S2108. In contrast, if it is determined that a value is not set in the ToOff correspondence portion in the BoundaryOffset setting numerical box 309, the CPU 426 advances the processing to step S2109.

In step S2108, the CPU 426 adds the BoundaryOffset field to the command stored in step S2001. Also, the value of this BoundaryOffset field is a value set in the ToOff correspondence portion in the BoundaryOffset setting numerical box 309.

Further, this BoundaryOffset field is associated with the BoundaryType field with the value being ToOff.

In step S2109, the CPU 426 determines whether or not a value is set in the ToOn correspondence portion in the delay time setting numerical box 311. If it is determined that a value is set in the ToOn correspondence portion in the delay time setting numerical box 311, the CPU 426 advances the processing to step S2110.

In contrast, if it is determined that a value is not set in the ToOn correspondence portion in the delay time setting numerical box 311, the CPU 426 advances the processing to step S2111.

In step S2110, the CPU 426 adds the ResponseTime field to the command stored in step S2001. The value of this ResponseTime field is a value set in the ToOn correspondence portion in the delay time setting numerical box 311. Further, this ResponseTime field is associated with the BoundaryType field with the value being ToOn.

In step S2111, the CPU 426 determines whether or not a value is set in the ToOff correspondence portion in the delay time setting numerical box 311. If it is determined that a value is set in the ToOff correspondence portion in the delay time setting numerical box 311, the CPU 426 advances the processing to step S1312.

In contrast, if it is determined that a value is not set in the ToOff correspondence portion in the delay time setting numerical box 311, the CPU 426 advances the processing to step S2008.

In step S2112, the CPU 426 adds the ResponseTime field to the command stored in step S2001. The value of this ResponseTime field is a value set in the ToOff correspondence portion in the delay time setting numerical box 311. Further, this ResponseTime field is associated with the BoundaryType field with the value being ToOff.

In step S2113, the CPU 426 instructs the display 422 to display information such as a message indicative of an error. This information, for example, represents the following state. That is, the value of the BoundaryOffset field corresponding to the BoundaryType field with the value being ToOn is smaller than the value of the BoundaryOffset field corresponding to the BoundaryType field with the value being ToOff.

In this case, the CPU 426 according to this embodiment corresponds to a display control unit that causes the display 422 to display information indicative of an error.

The client apparatus 2000 according to this embodiment can notify the user about incorrect setting of the value when each value of the BoundaryOffset field is set by the client apparatus 2000. Accordingly, the user who operates the client apparatus 2000 can recognize the incorrect setting before transmission of the SetImagingSettings command in which each value of the BoundaryOffset field is not correctly set.

Consequently, a phenomenon, in which the optical filter 4 is inserted into the optical path of the imaging optical system 2 although the brightness of the object is low, and the optical filter 4 is removed from the optical path of the imaging optical system 2 although the brightness of the object is high, can be prevented from occurring.

The IrCutFilterAutoAdjustment setting screen according to this embodiment corresponds to a user interface for inputting a value such as the BoundaryOffset field described in the SetImagingSettings command.

Fifth Embodiment

Next, a fifth embodiment of the invention is described with reference to FIG. 22. The same reference signs are applied to the same components as those of the above-described embodiments, and the description thereof is occasionally omitted.

Figure 22:
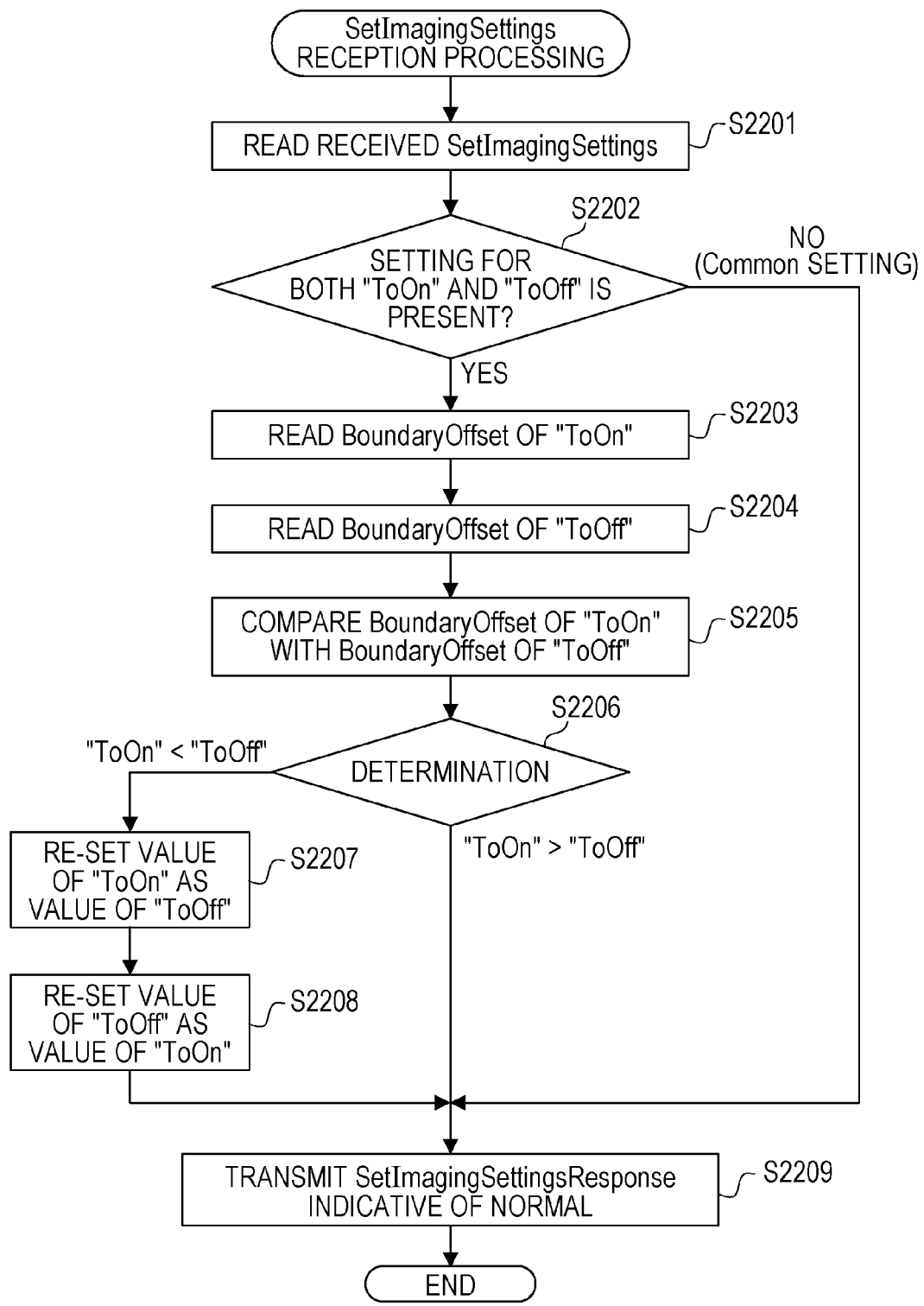
FIG. 22 is a flowchart for describing SetImagingSettings reception processing according to a fifth embodiment of the invention.

FIG. 22 is a flowchart for describing SetImagingSettings reception processing in the imaging apparatus 1000 according to this embodiment.

Steps S2201 to S2206 are similar to the above-described steps S1801 to S1806 in FIG. 18, and hence the description thereof is omitted.

In step S2207, the CPU 26 causes the EEPROM 28 to store the brightness threshold corresponding to the value read in step S2203, as the brightness threshold used for determining whether or not the optical filter 4 is removed from the optical path of the imaging optical system 2.

In step S2208, the CPU 26 causes the EEPROM 28 to store the brightness threshold corresponding to the value read in step S2204, as the brightness threshold used for determining whether or not the optical filter 4 is inserted into the optical path of the imaging optical system 2.

In step s2209, the CPU 26 instructs the I/F 14 to cause the client apparatus 2000 to transmit the SetImageingSettingsResponse which indicates normal.

As described above, this embodiment expects the following situation. That is, the value of the BoundaryOffset field corresponding to the BoundaryType field with the value being ToOn is smaller than the value of the BoundaryOffset field corresponding to the BoundaryType field with the value being ToOff.

The imaging apparatus 1000 according to this embodiment exchanges the values of the BoundaryOffset field, and sets the brightness thresholds at the determining circuit 20 based on the exchanged values.

Accordingly, without a table stored in the EEPROM 28, a phenomenon, in which the brightness threshold for determining whether or not the optical filter 4 is inserted into the optical path of the imaging optical system 2 becomes smaller than the brightness threshold for determining whether or not the optical filter 4 is removed from the optical path, can be prevented from occurring.

Also, the BoundaryOffset field according to the above-described embodiments can be said as a parameter for adjusting the boundary exposure level for switching the state of the infrared cut filter between being effective (On) and being ineffective (Off). In this case, being effective represents a state in which the optical filter 4 has been inserted into the optical path of the imaging optical system 2. Also, being ineffective represents a state in which the optical filter 4 has been removed from the optical path of the imaging optical system 2.

The value of this BoundaryOffset field is, for example, a normalized value in a range from −1.0 to +1.0, and has no unit. Further, regarding the value of the BoundaryOffset field, 0 is an initial value, −1.0 is darkest, and +1.0 is brightest.

Also, the BoundaryType field with the value being Common may be described in the SetImagingSettings command in the above-described embodiments. In this case, it is assumed that the BoundaryType field with the value being ToOn or the BoundaryType field with the value being ToOff is not described in this command.

In contrast, the BoundaryType field with the value being ToOn and the BoundaryType field with the value being ToOff can be described in the SetImagingSettings command according to the above-described embodiments. In this case, it is assumed that the BoundaryType field with the value being Common is not described in this command.

Hence, the BoundaryOffset field can be individually described in the SetImagingSettings command in each of the case in which the optical filter 4 is inserted into the optical path of the imaging optical system 2 and the case in which the optical filter 4 is removed from the optical path. Further, the BoundaryOffset field can be commonly described in the SetImagingSettings command for both the cases.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240990 filed Nov. 21, 2013 and No. 2014-017756 filed Jan. 31, 2014, which are hereby incorporated by reference herein in their entirety.

What is claimed is:

1. An imaging apparatus configured to make communication with an external apparatus through a network, the imaging apparatus comprising:
  an imaging optical system;
  an imaging unit configured to capture an image of an object by the imaging optical system;
  an optical filter;
  an inserting and removing unit configured to insert and remove the optical filter into and from an optical path of the imaging optical system;
  a receiving unit configured to receive an adjustment command from the external apparatus through the network, the adjustment command including individual adjustment values respectively for a case in which the optical filter is inserted into the optical path and a case in which the optical filter is removed from the optical path;
  an automatically determining unit configured to, based on one of the adjustment value of the case in which the optical filter is inserted into the optical path and the adjustment value of the case in which the optical filter is removed from the optical path, automatically determine the other adjustment value in the adjustment command received by the receiving unit; and
  a control unit configured to control the inserting and removing unit based on the one adjustment value received by the receiving unit and the other adjustment value determined by the automatically determining unit.

2. The imaging apparatus according to claim 1, wherein the automatically determining unit automatically determines the other adjustment value so that the adjustment value of the case in which the optical filter is inserted into the optical path becomes larger than the adjustment value of the case in which the optical filter is removed from the optical path.

3. The imaging apparatus according to claim 1, wherein the adjustment value of the case in which the optical filter is removed from the optical path and the adjustment value of the case in which the optical filter is inserted into the optical path can be set at values in a normalized same range.

4. The imaging apparatus according to claim 1, wherein the optical filter is an infrared cut filter that cuts infrared rays.

5. The imaging apparatus according to claim 1, wherein the adjustment values include a value relating to a brightness of the object, or a value relating to a delay time when the optical filter is inserted or removed by the inserting and removing unit.

6. The imaging apparatus according to claim 1, further comprising:
  a storing unit configured to store one of the adjustment value of the case in which the optical filter is inserted into the optical path and the adjustment value of the case in which the optical filter is removed from the optical path and the other adjustment value in an associated manner,
  wherein the automatically determining unit determines the other adjustment value with reference to the one adjustment value stored in the storing unit.

7. The imaging apparatus according to claim 1, wherein the automatically determining unit calculates the other adjustment value from the one adjustment value received by the receiving unit.

8. The imaging apparatus according to claim 1, further comprising:
a storing unit configured to store an offset,
wherein the automatically determining unit determines the other adjustment value based on the offset stored in the storing unit.

9. The imaging apparatus according to claim 1, further comprising:
a calculating unit configured to calculate a difference between a brightness of the object of the case in which the optical filter is inserted into the optical path by the inserting and removing unit and a brightness of the object of the case in which the optical filter is removed from the optical path by the inserting and removing unit,
wherein the automatically determining unit determines the other adjustment value based on the difference calculated by the calculating unit.

10. The imaging apparatus according to claim 1, further comprising:
a determining unit configured to determine whether or not only one of the adjustment value of the case in which the optical filter is inserted into the optical path and the adjustment value of the case in which the optical filter is removed from the optical path is included in the adjustment command received by the receiving unit,
wherein the automatically determining unit determines the other adjustment value if the determining unit determines that only the one adjustment value is included.

11. An external apparatus configured to make communication with an imaging apparatus through a network, the imaging apparatus including an inserting and removing unit configured to insert and remove an optical filter into and from an imaging optical system, and a control unit configured to control the inserting and removing unit, the external apparatus comprising:
a setting unit configured to set an adjustment command including adjustment values used by the control unit for controlling the inserting and removing unit, the adjustment values being individual adjustment values set respectively for a case in which the optical filter is inserted into the imaging optical system and a case in which the optical filter is removed from the imaging optical system by the inserting and removing unit;
a transmitting unit configured to transmit the adjustment command including the adjustment values set by the setting unit to the imaging apparatus through the network; and
a displaying unit configured to display the adjustment command transmitted by the transmitting unit so that, based on one of the adjustment values, the other adjustment value automatically determined by the control unit is displayed.

12. The external apparatus according to claim 11, further comprising a displaying unit configured to display the other adjustment value received by the receiving unit.

13. An external apparatus configured to make communication with an imaging apparatus including an inserting and removing unit configured to insert and remove an optical filter into and from an imaging optical system, the external apparatus comprising:
a transmitting unit configured to transmit an adjustment command through the network, the adjustment command including adjustment values used for controlling the inserting and removing unit, the adjustment values being individual adjustment values set respectively for a case in which the optical filter is inserted into the imaging optical system and a case in which the optical filter is removed from the imaging optical system by the inserting and removing unit; and
a receiving unit configured to receive setting information through the network, the setting information including an adjustment value automatically determined by the imaging apparatus based on the adjustment values,
wherein the adjustment command transmitted by the transmitting unit includes at least one of the adjustment values, and
wherein the setting information received by the receiving unit includes the other adjustment value automatically determined by a control unit.

14. The external apparatus according to claim 13, further comprising a warning unit configured to provide a warning indication for a predetermined period if only one of the adjustment value of the case in which the optical filter is inserted into the imaging optical system and the adjustment value of the case in which the optical filter is removed from the imaging optical system is described in the adjustment command transmitted by the transmitting unit.

15. An imaging system, comprising:
an imaging apparatus including
an imaging optical system,
an imaging unit configured to capture an image of an object by the imaging optical system,
an optical filter, and
an inserting and removing unit configured to insert and remove the optical filter into and from an optical path of the imaging optical system; and
an external apparatus configured to make communication with the imaging apparatus through a network,
wherein the external apparatus includes
a transmitting unit configured to transmit an adjustment command to the imaging apparatus through the network, the adjustment command including individual adjustment values respectively for a case in which the optical filter is inserted into the optical path and a case in which the optical filter is removed from the optical path by an inserting and removing unit, and
wherein the imaging apparatus includes
an automatically determining unit configured to, based on one of the adjustment values, automatically determine the other adjustment value in the adjustment command transmitted by the transmitting unit, and
a control unit configured to control the inserting and removing unit based on the one adjustment value transmitted by the transmitting unit and the other adjustment value determined by the automatically determining unit.

16. A control method of an imaging apparatus, the imaging apparatus including an imaging optical system, an imaging unit configured to capture an image of an object by the imaging optical system, an optical filter, and an inserting and removing unit configured to insert and remove the optical filter into and from an optical path of the imaging optical system, the imaging apparatus configured to make communication with an external apparatus through a network, the method comprising:
a receiving step of receiving an adjustment command from the external apparatus through the network, the adjustment command including individual adjustment values respectively for a case in which the optical filter is inserted into the optical path and a case in which the optical filter is removed from the optical path by the inserting and removing unit;

an automatically determining step of, based on one adjustment value of the respective adjustment values, automatically determining the other adjustment value in the adjustment command transmitted in the transmitting step; and a control step of controlling the inserting and removing unit based on the one adjustment value received in the receiving step and the other adjustment value determined in the automatically determining step.

* * * * *